United States Patent
Kanayama et al.

(10) Patent No.: US 6,762,250 B2
(45) Date of Patent: Jul. 13, 2004

(54) POLYCARBONATE RESIN COMPOSITION

(75) Inventors: Satoshi Kanayama, Hiratsuka (JP); Kenichi Narita, Hiratsuka (JP); Masaki Tamura, Hiratsuka (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 0 days.

(21) Appl. No.: 10/455,825

(22) Filed: Jun. 4, 2003

(65) Prior Publication Data

US 2004/0054116 A1 Mar. 18, 2004

(30) Foreign Application Priority Data

| Jun. 7, 2002 | (JP) | ...................................... | 2002-166969 |
| Aug. 6, 2002 | (JP) | ...................................... | 2002-228496 |
| Aug. 30, 2002 | (JP) | ...................................... | 2002-252555 |
| Sep. 24, 2002 | (JP) | ...................................... | 2002-277621 |
| Sep. 24, 2002 | (JP) | ...................................... | 2002-277622 |
| Sep. 25, 2002 | (JP) | ...................................... | 2002-278400 |
| Sep. 25, 2002 | (JP) | ...................................... | 2002-278401 |

(51) Int. Cl.$^7$ .......................................... C08K 5/5419
(52) U.S. Cl. ...................... 525/464; 525/446; 525/101; 524/262; 528/30
(58) Field of Search ............................ 528/30; 525/464, 525/446, 101; 524/262

(56) References Cited

U.S. PATENT DOCUMENTS

| 4,130,530 | A | | 12/1978 | Mark et al. | |
| 4,397,973 | A | * | 8/1983 | Scott et al. | ................. 524/114 |
| 4,926,890 | A | * | 5/1990 | Hoskins | ....................... 132/73 |
| 5,070,171 | A | * | 12/1991 | O'Lenick, Jr. | ............... 528/33 |
| 5,354,815 | A | * | 10/1994 | Barringer et al. | ........... 525/431 |
| 6,175,028 | B1 | * | 1/2001 | O'Lenick, Jr. | .............. 556/405 |

FOREIGN PATENT DOCUMENTS

| JP | 54-100453 | 8/1979 |
| JP | 55-18406 | 2/1980 |
| JP | 3-79626 | 4/1991 |
| JP | 3-84028 | 4/1991 |
| JP | 5-262960 | 10/1993 |

* cited by examiner

Primary Examiner—Margaret G. Moore
(74) Attorney, Agent, or Firm—David G. Conlin; John B. Alexander; Edwards & Angell, LLP

(57) ABSTRACT

The present invention relates to a polycarbonate resin composition comprising (A) 100 parts by weight of a polycarbonate resin and (B) 0.001 to 20 parts by weight of a siloxane compound which is a polyorganosiloxane having such a structure that at least (1) an aromatic hydrocarbon group, (2) an aliphatic or aromatic organic group having at least one carboxylic acid ester linkage, ether linkage or mixture thereof, and (3) a phosphorus atom-containing group, are bonded to the silicon atoms therein.

12 Claims, No Drawings

POLYCARBONATE RESIN COMPOSITION

BACKGROUND OF THE INVENTION

The present invention relates to a polycarbonate resin composition and more particularly to a polycarbonate resin composition comprising a polycarbonate resin and a siloxane compound and having excellent transparency and fluidity.

Thermoplastic resins, especially polycarbonate resins are used for a wide range of application because of their many advantageous properties such as high mechanical strength, impact strength, heat resistance, excellent electrical properties and transparency. These resins, however, have the disadvantage of being usually poor in moldability due to their high melting temperature and high viscosity in the molten state.

It is generally known to improve fluidity of polycarbonate resins by reducing their molecular weight, but this method involves the problem of adversely affecting the mechanical properties, particularly impact resistance of the resins.

Attempts have been made to blend various types of plasticizers or other resins for improving fluidity of polycarbonate resins.

For example, Japanese Patent Application Laid-Open (KOKAI) No. 55-18406 proposes blending of a cyclic siloxane compound, Japanese Patent Application Laid-Open (KOKAI) No. 54-100453 teaches addition of a siloxyoxyalkylene block copolymer, Japanese Patent Application Laid-Open (KOKAI) No. 3-79626 discloses a method comprising copolymerization of the silicone chains to a polycarbonate, Japanese Patent Application Laid-Open (KOKAI) No. 3-84028 proposes a method using a polydimethylsiloxane-added isopropenylphenol as polycarbonate chain terminator, and Japanese Patent No. 3,090,764 discloses a method which comprises reacting a both-end epoxy-terminated organopolysiloxane and a polycarbonate. Any of these proposed methods, however, has its own problems, such as unsatisfactory effect, sacrifice in transparency, mechanical properties, heat resistance, etc., and expensiveness.

SUMMARY OF THE INVENTION

An object of the present invention is to provide a polycarbonate resin composition having excellent transparency and fluidity.

In the first aspect of the present invention, there is provided a polycarbonate resin composition comprising (A) 100 parts by weight of a polycarbonate resin and (B) 0.001 to 20 parts by weight of a siloxane compound which is a polyorganosiloxane having such a structure that at least (1) an aromatic hydrocarbon group, (2) an aliphatic or aromatic organic group having at least one carboxylic acid ester linkage, ether linkage or mixture thereof, and (3) a phosphorus atom-containing group, are bonded to the silicon atoms therein.

In the second aspect of the present invention, there is provided a polycarbonate resin composition comprising (A) 95 to 5 parts by weight of a polycarbonate resin, (C) 5 to 95 parts by weight of a styrene resin, and (B) a siloxane compound in an amount of 0.001 to 20 parts by weight to 100 parts by weight of (A) and (C) combined, said siloxane compound of (B) being the polyorganosiloxane as defined in the first aspect.

In the third aspect of the present invention, there is provided a polycarbonate resin composition comprising (A) 95 to 5 parts by weight of a polycarbonate resin, (D) 5 to 95 parts by weight of a polyester resin, and (B) a siloxane compound in an amount of 0.001 to 20 parts by weight to 100 parts by weight of (A) and (D) combined, said siloxane compound of (B) being the polyorganosiloxane as defined in the first aspect.

In the fourth aspect of the present invention, there is provided a polycarbonate resin composition comprising (A) 99.9 to 50 parts by weight of a polycarbonate resin, (E) 0.1 to 50 parts by weight of a copolyester resin comprising at least two kinds of dicarboxylic acids and a diol, with 1 to 50 mol % of said dicarboxylic acids being constituted by naphthalenedicarboxylic acid, and (B) a siloxane compound in an amount of 0.001 to 20 parts by weight to 100 parts by weight of (A) and (E) combined, said siloxane compound of (B) being the polyorganosiloxane as defined in the first aspect.

DETAILED DESCRIPTION OF THE INVENTION

A detailed description of the present invention follows.

The polycarbonate resin (A) use in the present invention is obtainable by the known methods, for example, interfacial polymerization method, pyridine method and ester exchange method, which are described in detail in, for instance, Handbook of Polycarbonate Resins (NIKKAN KOGYO SHIMBUN, LTD (1992)).

More specifically, the subject polycarbonate resin is a polymer or copolymer of linear or branched thermoplastic aromatic polycarbonate, which can be obtained by reacting aromatic dihydroxyl compound, or the said compounds and small quantities of polyhydroxyl compound(s), with carbonyl chloride generally known as phosgene, or carbonic acid diester exemplified by dimethyl carbonate and diphenyl carbonate, or carbonyl compound such as carbon monoxide and carbon dioxide.

Examples of the aromatic dihydroxyl compound usable for the above-said reaction include: bis(hydroxyaryl)alkanes such as 2,2-bis(4-hydroxyphenyl)propane (bisphenol A), 2,2-bis(3,5-dibromo-4-hydroxyphenyl)propane (tetrabromobisphenol A), bis(4-hydroxyphenyl)methane, 1,1-bis(4-hydroxyphenyl)ethane, 2,2-bis(4-hydroxyphenyl)butane, 2,2-bis(4-hydroxyphenyl)octane, 2,2-bis(4-hydroxy-3-methylphenyl)propane, 1,1-bis(3-tert-butyl-4-hydroxyphenyl)propane, 2,2-bis(4-hydroxy-3,5-dimethylphenyl)propane, 2,2-bis(3-bromo-4-hydorxyphenyl)propane, 2,2-bis(3,5-dichloro-4-hydroxyphenyl)propane, 2,2-bis(3-phenyl-4-hydroxyphenyl)propane, 2,2-bis(3-cyclohexyl-4-hydroxyphenyl)propane, 1,1-bis(4-hydroxyphenyl)-1-phenylethane, bis(4-hydroxyphenyl)diphenylmethane, 2,2-bis(4-hydroxyphenyl)-1,1,1-trichloropropane, 2,2-bis(4-hydroxyphenyl)-1,1,1,3,3,3-hexachloropropane, and 2,2-bis(4-hydroxyphenyl)-1,1,1,3,3,3-hexafluoropropane; bis(hydroxyaryl)cycloalkanes such as 1,1-bis(4-hydroxyphenyl)cyclopentane, 1,1-bis(4-hydroxyphenyl)cyclohexane, and 1,1-bis(4-hydroxyphenyl)-3,3,5-trimethylcyclohexane; bisphenols having a caldo structure such as 9,9-bis(4-hydroxyphenyl)fluorene and 9,9-bis(4-hydroxy-3-methylphenyl)fluorene; dihydroxydiaryl ethers such as 4,4'-dihydroxydiphenyl ether and 4,4'-dihydroxy-3,3'-dimethyldiphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; hydroquinone, resorcin, 4,4'-dihydroxydiphenyl and the like. These aromatic dihydroxyl compounds may be used either singly or as a mixture of two or more. Of these compounds, 2,2-bis(4-hydroxyphenyl) propane is especially preferable.

For obtaining the branched aromatic polycarbonate resin, it is preferable to use polyhydroxyl compounds such as phloroglycine, 2,6-dimethyl-2,4,6-tris(4-hydroxyphenyl)-3-heptene, 4,6-dimethyl-2,4,6-tris(4-hydroxyphenyl)-2-heptene, 1,3,5-tris(2-hydroxyphenyl)benzole, 1,1,1-tris(4-hydroxyphenyl)ethane, 2,6-bis(2-hydroxy-5-methylbenzyl)-4-methylphenol, and α, α', α"-tris(4-hydroxyphenyl)-1,3,5-triisopropylbenzne, or 3,3-bis(4-hydroxyaryl)oxyindole (isatin bisphenol), 5-chloroisatin bisphenol, 5,7-dichloroisatin bisphenol, 5-bromoisatin bisphenol or the like.

In the case of the polycarbonate produced by interfacial polymerization method, an end stopper or a molecular weight modifier may be used. As such an end stopper or molecular weight modifier, the compounds having monovalent phenolic hydroxyl group or a monovalent carboxylic acid derivative structure can be cited as examples. The said compounds having monovalent phenolic hydroxyl group include phenols and substituted phenols such as alkylphenol, halogenated phenol, alkoxyphenol and alkoxycarbonylphenyl, more specifically phenols, methylphenol, p-n-butylphenol, p-tert-butylphenol, p-tert-octylphenol, allylphenol, cumylphenol, naphthylphenol, naphthol, bromophenol, tribromophenol, trifluorophenol, methoxyphenol, butoxyphenol, methoxycarbonylphenol, butoxycarbonylphenol, dodecyloxycarbonylphenol, octadecyloxycarbonylphenol, and the like. Examples of the compounds having a monovalent carboxylic acid derivative structure include carboxylic acids and carboxylic acid chlorides, more specifically such carboxylic acids as acetic acid, acrylic acid, formic acid, propionic acid, propiolic acid, butyric acid, isobutyric acid, methacrylic acid, palmitic acid, stearic acid, pyruvic acid, acetoacetic acid, glycolic acid, lactic acid, glyceric acid, hexafluoroacetic acid, benzoic acid, naphthoic acid, methylbenzoic acid, butylbenzoic acid, vinylbenzoic acid, pentafluorobenzoic acid, pentabromobenzoic acid, methylnaphthoic acid and ethylnaphthoic acid, as well as carboxylic acid chlorides derived from these carboxylic acids.

In the case of the polycarbonates produced by ester exchange method, the fruction of the hydroxy-terminated structure can be usually controlled by adjusting the molar ratio of the starting dihydroxyl compound to the carbonic acid diester, or by adjusting the degree of pressure reduction. It is also known to add a terminator separately in the course of the reaction as a more positive controlling method. As the terminator, there are exemplified monovalent phenols, monovalent carboxylic acids and carbonic acid diesters, especially the monovalent phenols or monovalent carboxylic acids with a carbon number of 9 or more. The typical examples thereof are p-propylphenol, o-sec-butylphenol, p-tert-butylphenol, cumylphenol, tert-octylphenol, phenylphenol, naphthylphenol, 4-hydroxy-p-quaterphenyl, butylbenzoic acid, octylbenzoic acid, phenylbenzoic acid, and naphthalenecaboxylic acid. Preferred examples of the carbonic acid diesters are those derived from the said monovalent phenols with a carbon number of 9 or greater, specifically phenylbutylphenyl carbonate, di(butylphenyl) carbonate, phenylcumylphenyl carbonate, di(nonylphenyl) carbonate, methylphenylnaphthylphenyl carbonate, etc.

The polycarbonate resins usable in the present invention may be used either singly or as a mixture of two or more.

The molecular weight of the polycarbonate resins used in the present invention is preferably in the range of 10,000 to 100,000, more preferably 15,000 to 50,000, in terms of viscosity-average molecular weight calculated from the solution viscosity measured at 20° C. using dichloromethane as solvent.

The siloxane compounds used in the present invention are polyorganosiloxanes having such a structure that at least (1) an aromatic hydrocarbon group, (2) an aliphatic or aromatic organic group having at least one carboxylic acid ester linkage and/or ether linkage, and (3) a phosphorus atom-containing group, are bonded to the silicon atoms in their structure.

The aromatic hydrocarbon group (1) is selected from those with a carbon number of 6 to 50, such as aryl, alkylaryl, arylalkyl, alkylarylalkyl, arylalkylaryl and arylalkylarylalkyl. The aryl structure is, for instance, a structure derived from an aromatic ring such as benzene ring, naphthalene ring, anthracene ring or phenanthrene ring, and the alkyl structure may be a linear or branched chain structure using an alkane such as methane, ethane, propane, butane, pentane, hexane, heptane or octane as starting material. The said aromatic hydrocarbon groups are those represented by a combination of these aryl structure and alkyl structure. Examples of such aromatic hydrocarbon groups are phenyl, methylphenyl, ethylphenyl, propylphenyl, butylphenyl, octylphenyl, dimethylphenyl, methylethylphenyl, diethylphenyl, dibutylphenyl, phenylphenyl, phenylmethylphenyl, phenetylphenyl, cumylphenyl, naphthyl, methylnaphthyl, ethylnaphthyl, anthracenyl, methylanthracenyl, phenanethrenyl, phenylmethyl, phenylethyl, phenylpropyl, phenylisopropyl, methylphenylethyl, naphthylmethyl, methylnaphthylethyl, and cumylphenylethyl. One or more of these aromatic hydrocarbon groups may exist in the molecule. Among these aromatic hydrocarbon groups, phenyl, methylphenyl, naphthyl, naphthylethyl, phenylethyl and methylphenylethyl are preferred. Phenyl, phenylethyl naphthyl and naphthylethyl are more preferred.

The organic groups mentioned as (2) above are the groups having at least one carboxylic acid ester linkage and/or ether linkage and preferably possessing one or more carboxylic acid ester group(s) as repeating units. They also include the groups comprising at least one group having ether linkage and preferably possessing a plural number of such groups of ether linkage as repeating units. The groups having both of carboxylic acid ester linkage and ether linkage are also preferable. Examples of such groups are those represented by the formulae:

—R¹—(O—R¹)$_m$—O(—CO—R¹—O)$_n$—R²,

—R¹—(O—R¹)$_m$—O(—CO—R¹—CO—O—R¹—O)$_n$—R², and
—R¹—O—(R¹—O—)$_n$—R²

(wherein R¹s represent independently a $C_1$–$C_{30}$ aliphatic hydrocarbon group or an aromatic hydrocarbon group which may have a $C_6$–$C_{50}$ aliphatic hydrocarbon group as substituent; m in an integer of 0 to 100; n is an integer of 1 to 100; and R² represents a hydrogen atom, a $C_1$–$C_{30}$ aliphatic hydrocarbon group or a $C_6$–$C_{40}$ aromatic hydrocarbon group). The groups represented by the formulae —R¹—(O—R¹)$_m$—O(—CO—R¹—O)$_n$—R² and —R¹—O—(R¹—O—)$_n$—R² are especially preferred.

Examples of the $C_1$–$C_{30}$ aliphatic hydrocarbon groups represented by R¹ in the above-shown formulae include $C_1$–$C_{30}$ alkylidene groups such as methylene, ethylene, propylene, propylidene, butylene, butylidene, pentylene, hexylene, octylene, decylene, dodecylene, octadecylene, eicocylene, cyclopentylene, cyclohexylene, cycloheptylene, cyclohexylmethylene, cyclohexylethylene and cyclohexanedimethylene, which may be either linear or branched. These aliphatic hydrocarbon groups may exist either singly or two or more. Preferred among these alkylidene groups are methylene, ethylene, propylene, propylidene, butylene and butylidene.

In the aromatic hydrocarbon groups which may have a $C_6$–$C_{50}$ aliphatic hydrocarbon group as substituent, examples of the arylene groups are phenylene, naphthylene and these groups substituted with the above-mentioned aliphatic hydrocarbon groups. Examples of the arylalkylidene groups are those in which the aryl groups such as phenyl, naphtyl, etc., have been substituted with the said alkylidene groups.

The aliphatic substituent groups include the groups mentioned above as well as combinations of these groups with the groups mentioned above as arylene groups.

$R^2$ in the above formulae represents, beside hydrogen atom, the alkyl, aryl and arylalkyl groups mentioned above.

Letter m in the above formulae represents an integer of 0 to 100, its lower limit being preferably not less than 1, more preferably not less than 2, and the upper limit being preferably not more than 50. Letter n represents an integer of 1 to 100, its lower limit being preferably not less than 1, more preferably not less than 2, and the upper limit being preferably not more than 50.

The phosphorus atom-containing group (3) is a group in which the phosphorus atom exists in the form of phosphorous acid, phosphorous monoester, phosphorous diester, phosphoric acid, phosphoric monoester, phosphoric diester or the like. Specifically, the groups represented by the following structural formula (I) are preferable:

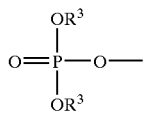

(I)

wherein $R^3$s represent independently a hydrogen atom, a $C_1$–$C_{30}$ alkyl group, a $C_6$–$C_{50}$ aryl group, an arylalkyl group, a polyether group or a polyorganosiloxane group.

As the alkyl, aryl and arylalkyl groups represented by $R^3$, those exemplified before can be cited as examples, but methyl, ethyl, propyl, butyl, phenyl and such are preferred.

The polyether groups may be either aliphatic or aromatic as far as they are the groups derived from diols or cyclic ethers, but the groups derived from ethylene glycol, ethylene oxide, propylene glycol, propylene oxide or such are preferred. The number of the repeating units is 1 to 100, preferably 2 to 100, and the terminal may be either OH structure or alkyl ether structure. The polyorganosiloxane groups are the ones in which the number of the repeating units is 3 to 1,000, its lower limit being preferably 6 and the upper limit being preferably 100, more preferably 50. The polyorganosiloxane groups are preferably those having $C_1$–$C_{30}$ alkyl groups, $C_6$–$C_{50}$ aryl groups or arylalkyl groups.

The siloxane compounds used in the present invention are preferably of a structure in which siloxane bonds are connected linearly, but may have a partial branched structure. In the present invention, it is more preferable to use linear siloxane compounds in which at least one each of (1) aromatic hydrocarbon groups, (2) aliphatic or aromatic organic groups having at least one carboxylic acid ester linkage and/or ether linkage, and (3) phosphorus atom-containing groups, such as mentioned above, are bonded to the side chains of the compound.

Exemplary of such linear polyorganosiloxanes are those of the structure represented by the formula M—(W)$_n$—M wherein M indicates monofunctional structural unit, W indicates bifunctional structural unit, and n is an integer of 3 to 1,000. W consists of aliphatic structural unit A, aromatic structural unit B, structural unit C having carboxylic acid ester linkage and/or ether linkage, and phosphorus atom-containing structural unit D, with the ratios of these structural units in W being: unit A=0 to 0.6, unit B=0.1 to 0.9, unit C=0.01 to 0.4, and unit D=0.01 to 0.4, with unit A+unit B+unit C+unit D=1.

Examples of M are the groups of the structure represented by the formula:

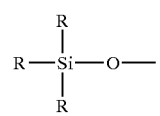

wherein "R"s represent independently an aliphatic hydrocarbon group. More specifically, R in the above formula is preferably, for instance, a $C_1$–$C_{10}$ alkyl group. Examples thereof include the groups of the following formulae but are not limited thereto:

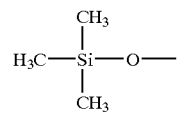

Further, the polyorganosiloxanes used in the present invention are preferably of the structure represented by the following structural formula (II):

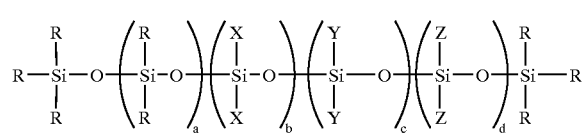

(II)

wherein R represents an aliphatic hydrocarbon group; "X"s represent independently a hydrogen atom, an aliphatic hydrocarbon group or an aromatic hydrocarbon group, but at least one of X is an aromatic hydrocarbon group; "Y"s represent independently a hydrogen atom, an aliphatic hydrocarbon group, an aromatic hydrocarbon group or an aliphatic or aromatic organic group having at least one carboxylic acid ester linkage and/or ether linkage, but at least one of Y is the said organic group; "Z"s represent independently a hydrogen atom, an aliphatic hydrocarbon group, an aromatic hydrocarbon group or a phosphorus atom-containing group, but at least one of Z is a phosphorus atom-containing group; a is a positive integer or 0, and b, c and d are each a positive integer, but $3 \leq a+b+c+d \leq 1,000$.

In the above structural formula (II), the aliphatic structural unit A, aromatic structural unit B, structural unit C having carboxylic acid ester linkage and/or ether linkage, and phosphorus atom-containing structural unit D constituting the bifunctional group component W in the formula M—(W)$_n$—M are as specified below, and the compounds having the structural units A-D selected from the following can be cited as preferred examples of the polyorganosiloxanes used in the present invention.
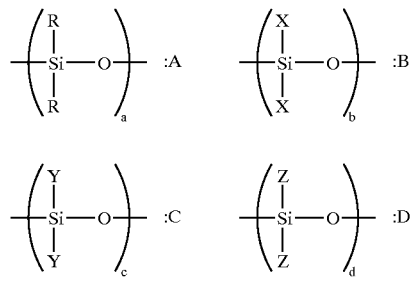
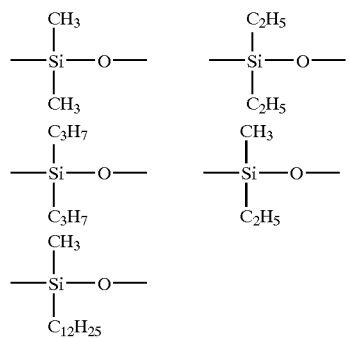
Examples of one repeating unit of structural unit A:
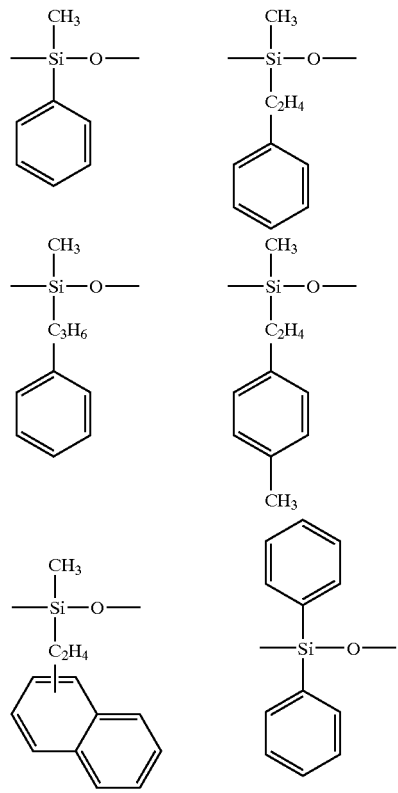
Examples of one repeating unit of structural unit B:
-continued
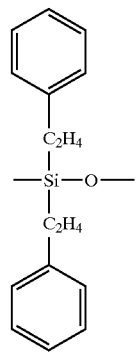
Examples of one repeating unit of structural unit C:
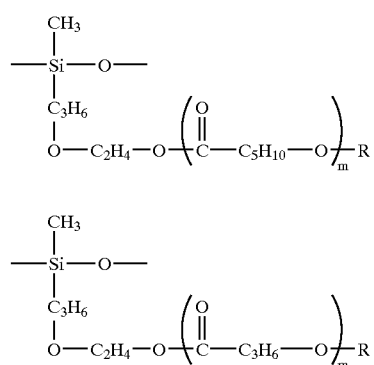
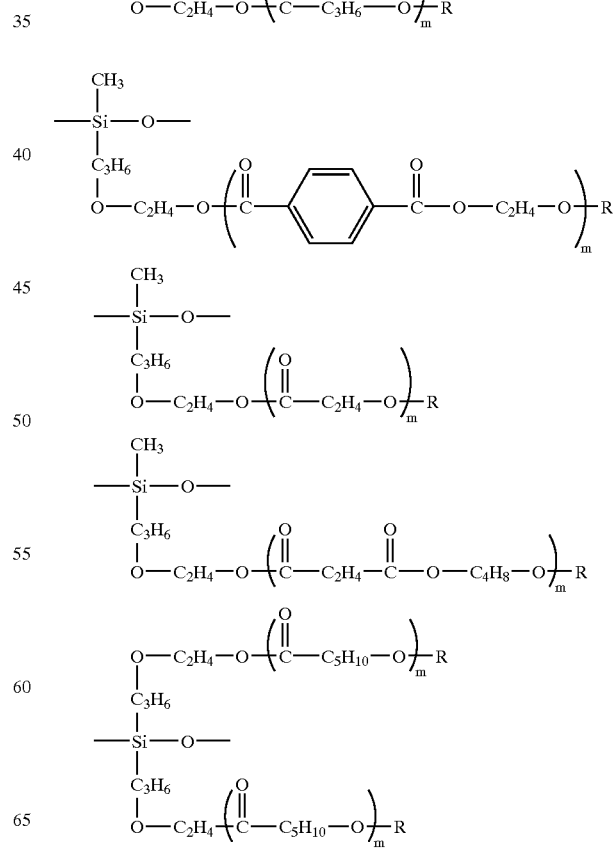

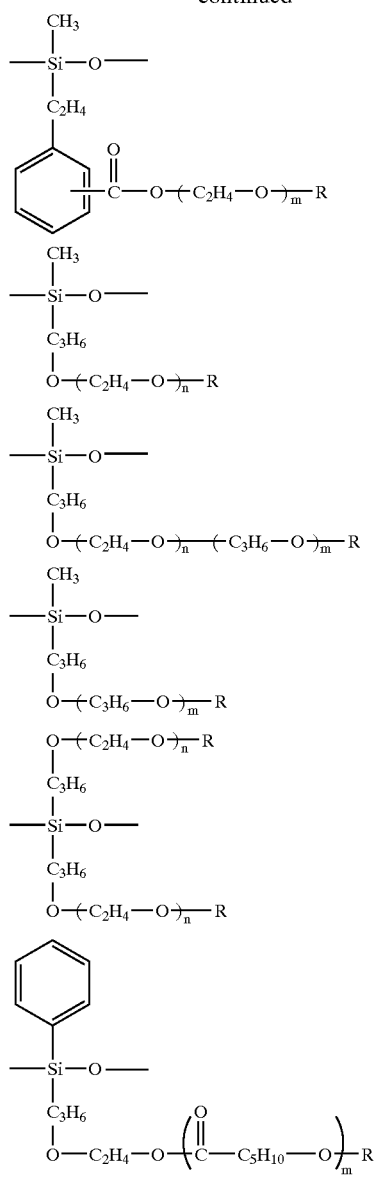

Examples of one repeating unit of structural unit D:

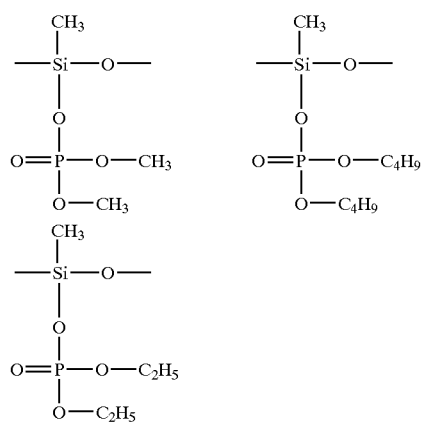

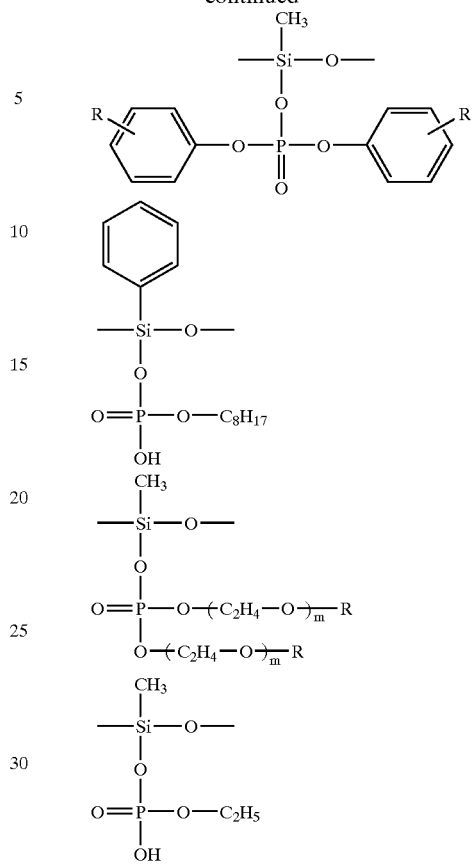

Letters a, b, c and d in the structural units indicate the numbers of the respective structural units, a being a positive integer or 0, and b, c and d being each a positive integer. Preferably the lower limit of a+b+c+d is 3 and the upper limit is 1,000 Less than 3 of the total of a+b+c+d is not preferable because of the problems relating to volatility, etc. The more preferable lower limit is 6. The upper limit is preferably not more than 100, more preferably not more than 50. If the upper limit is set too high, viscosity tends to become exceedingly high to worsen the handling qualities.

The values expressing the ratios of a, b, c and d to the total number of the bifunctional structural units are indicated by R(A), R(B), R(C) and R(D), respectively, in the following discussion.

The lower limit of R(A) is preferably 0 and its upper limit is preferably 0.6. When R(A) exceeds 0.6, transparency of the composition may be affected.

The lower limit of R(B) is preferably 0.1 while its upper limit is preferably 0.9. When R(B) is less than 0.1, problem may arise on transparency of the composition. On the other hand, when R(B) exceeds 0.9, the fluidity improving effect may be reduced. More preferably, the lower limit is 0.2 and the upper limit is 0.85.

The lower limit of R(C) is preferably 0.01 and its upper limit is preferably 0.4. When R(C) is below 0.01, transparency of the composition may deteriorate and when it exceeds 0.4, heat resistance may be affected. More preferably, the lower limit of C is 0.05 and its upper limit is 0.3.

The lower limit of R(D) is preferably 0.01 and its upper limit is preferably 0.4. When R(D) is less than 0.01, the fluidity improving effect may be unsatisfactory, and when it exceeds 0.4, heat resistance may deteriorate. More preferably, the lower limit of D is 0.05 and its upper limit is 0.3.

The ratios of the structural units were calculated from the determination data obtained through $^1$H-NMR analysis of the siloxane compounds used, and expressed by molar content (mol/mol).

The siloxane compounds used in the present invention have the above-described characteristics, and these compounds may be used either solely or as a mixture of two or more.

These siloxane compounds can be produced by the known methods such as described in Silicon Handbook (NIKKAN KOGYO SHIMBUN, LTD (1990)).

In a process, for instance, an organochlorosilane is synthesized by the substitution method or direct method, then an alcohol or such is reacted therewith to obtain an organoalkoxysilane, and then a condensation reaction is carried out using such an organochlorosilane or organoalkoxysilane to produce a corresponding siloxane compound. The Si—H group in the thus obtained siloxane compound is subjected to an addition reaction with a compound having a functional group, such as alkene, alkine, alcohol, carboxylic acid, phosphoric acid, etc., which corresponds to the substituent group of the objective siloxane compound. In this addition reaction of the Si—H group, it is possible to use as catalyst a metal such as platinum, palladium, nickel, rhodium, etc., or a compound or complex thereof. For the preparation of the siloxane compounds used in the present invention, it is possible to apply, for instance, the preparation process of organopolysiloxane-polylactone copolymers described in Japanese Patent Application Laid-Open (KOKAI) No. 6-128380 or the preparation process of polyorganosiloxane phosphate disclosed in Japanese Patent Application Laid-Open (KOKAI) No. 2001-247582.

These siloxane compounds are also available from the market.

As for the ratio of the siloxane compound(s) to the polycarbonate resin(s) in the thermoplastic resin composition of the present invention, the former is in the range of 0.001 to 20 parts by weight to 100 parts by weight of the latter. When the ratio of the siloxane compound(s) is less than 0.001 parts by weight, the fluidity improving effect may be unsatisfactory while when it exceeds 20 parts by weight, heat resistance may deteriorate. The lower limit of the ratio of the siloxane compound(s) is preferably not less than 0.05 parts by weight, more preferably not less than 0.1 parts by weight, and its upper limit is preferably not more than 10 parts by weight, more preferably not more than 5 parts by weight The polycarbonate resin composition according to the present invention is excellent in both fluidity and transparency, and is useful when the haze measured according to JIS K6714 (specimen thickness: 3 mm) is not more than 10%, especially when it is not more than 5%.

As means for producing the thermoplastic resin composition according to the present invention, a process can be exemplified in which the starting materials are blended and kneaded by various means known in the art at any preferable stage in the process till start of final molding. Blending can be accomplished, for example, by mixing with a tumbler, Henschel mixer or the like, or by supplying the materials quantitatively to an extruder hopper by a feeder and mixing them. Kneading may be effected by using a single-screw extruder, double-screw extruder or like means.

In the thermoplastic resin composition of the present invention, in order to afford desired specific properties to the composition according to the purpose of use, there may be contained one or more of other polymers such as polyester resins, polystyrene resins, polyolefin resins, etc., or flame-retardant, impact resistance improver, antioxidant, heat stabilizer, ultraviolet absorber, antistatic agent, plasticizer, release agent, lubricant, compatibilizing agent, foaming agent, reinforcing agents or fillers such as glass fiber, glass beads, glass flakes, carbon fiber, fibrous magnesium, potassium titanate whisker, ceramic whisker, mica, talc, etc., dyes and other additives.

Further, in the present invention, in order to enhance especially molding work stability, it is expedient to add molding work stabilizing agents such as phosphoric antioxidants, phenolic antioxidants and sulfuric antioxidants.

Examples of the phosphoric antioxidants usable in the present invention are triphenyl phosphite, tris(nonylphenyl) phosphite, dilaurylhydrogen phosphite, triethyl phosphite, tridecyl phosphite, tris(2-ethylhexyl) phosphite, tris(tridecyl) phosphite, tristearyl phosphite, diphenylmonodecyl phosphite, monophenyldidecyl phosphite, diphenylmono(tridecyl) phosphite, tetraphenyldipropylene glycol diphosphite, tetraphenyltetra(tridecyl)pentaerythritol tetraphosphite, hydrogenated bisphenol A phenol phosphite polymer, diphenylhydrogen phosphite, 4,4'-butylidene-bis (3-methyl-6-tert-butylphenyldi(tridecyl) phosphite, tetra(tridecyl) 4,4'-isopropylidenediphenyldiphosphite, bis(tridecyl)pentaerythritol diphosphite, bis(nonylphenyl) pentaerythritol diphosphite, dilaurylpentaerythritol diphosphite, distearylpentaerythritol diphosphite, tris(4-tert-butylphenyl) phosphite, tris(2,4-di-tert-butylphenyl) phosphite, hydrogenated bisphenol A pentaerythritol phosphite polymer, tetrakis(2,4-di-tert-butylphenyl) 4,4'-biphenylenephosphonite, bis(2,4-di-tert-butylphenyl) pentaerythritol diphosphite, bis(2,6-di-tert-butyl-4-methylphenyl)pentaerythritol diphosphite, 2,2'-methylenebis (4,6-di-tert-butylphenyl) octylphosphite, ethyldiethyl phosphonoacetate, methyl acid phosphate, ethyl acid phosphate, propyl acid phosphate, ispropyl acid phosphate, butyl acid phosphate, butoxyethyl acid phosphate, octylic acid phosphate, 2-ethylhexyl acid phosphate, decylic acid phosphate, lauric acid phosphate, stearic acid phosphate, oleic acid phosphate, behenic acid phosphate, phenyl acid phosphate, nonylphenyl acid phosphate, cyclohexyl acid phosphate, phenoxyethyl acid phosphate, alkoxypolyethylene glycolic acid phosphate, bisphenol A acid phosphate, dimethyl acid phosphate, diethyl acid phosphate, dipropyl acid phosphate, disisopropyl acid phosphate, dibutyl acid phosphate, dioctyl acid phosphate, di-2-ethylhexyl acid phosphate, dilauric acid phosphate, distearic acid phosphate, diphenyl acid phosphate, bisnonylphenyl acid phosphate, and hexamethylphosphoric triamide. These compounds may be used singly or as a mixture of two or more.

Examples of the phenolic antioxidants include: 1,1-bis(5-tert-butyl-2-methyl-4-hydroxyphenyl)butane, 1,1,3-tris(5-tert-butyl-2-methyl-4-hydroxyphenyl)butane, octadecyl-3-(3,5-di-tert-butyl-4-hydroxyphenyl) propionate, pentaerithrityl-tetrakis(3-(3,5-di-tert-butyl-4-hydroxyphenyl) propionate), 2,2-thio-diethylenebis(3-(3,5-di-tert-butyl-4-hydroxyphenyl) propionate), 3,9-bis(2-(3-(3-tert-butyl-4-hydroxy-5-methylphenyl)-propionyloxy)-1,1-dimethylethyl)-2,4,8,10-tetraoxaspiro[5,5]undecane, 1,3,5-trimethyl-2,4,6-tris(3,5-di-tert-butyl-4-hydroxybenzyl) benzene, tris-(3,5-di-tert-butyl-4-hydroxybenzyl)-isocyanurate, triethyleneglycol-bis(3-(3-tert-butyl-5-methyl-4-hydroxyphenyl) propionate), 1,6-hexanediol-bis (3-(3,5-di-tert-butyl-4-hydroxyphenyl) propionate), 2,4-bis (n-octylthio)-6-(4-hydroxy-3,5-di-tert-butylanilino)-1,3,5-triazine, N,N'-hexamethylenebis(3,5-di-tert-butyl-4-hydroxy-hydrocinnamide), N,N'-bis(3-(3,5-di-tert-butyl-4- hydroxyphenyl)propionyl)hydrazine, 2,2'-thiobis(4-methyl-6-tert-butylphenol), 3,5-di-tert-butyl-4-hydroxybenzylphosphonate-diethyl ester, 4,4'-thiobis(3-methyl-6-tert-butylphenol), 4,4'-thiobis-(2-methyl-6-tert-butylphenol), 2,2'-methylenebis-(4-methyl-6-tert-butylphenol), and 2,2'-ethylidenebis(4,6-di-tert-butylphenol). These compounds may be used singly or as a mixture of two or more.

Examples of the sulfuric antioxidants include didodecyl-3,3'-thiodipropionate, ditetradecyl-3,3'-thiodipropionate, dioctadecyl-3,3'-thiodipropionate, ditridecyl-3,3'-thiodipropionate, pentaerithrityltetrakis(3-dodecylthiopropionate), pentaerithrityltetrakis(3-tetradecylthiopropionate), and pentaerithrityltetrakis(3-tridecylthiopropinoate) These compounds may be used singly or as a mixture of two or more.

Two or more different types of antioxidants may be used in combination, but it is preferable that at least one of them is a phosphoric antioxidant. It is especially preferable to use a phosphoric antioxidant alone or a combination of a phosphoric antioxidant and a phenolic antioxidant.

The ratio of the molding work stabilizer in the thermoplastic resin composition of the present invention should be 0.001 to 1 part by weight to 100 parts by weight of the polycarbonate resin. When its ratio is less than 0.001 parts by weight, satisfactory stability improving effect may not be obtained in molding work, and also when the said ratio exceeds 1 part by weight, stability in molding work may be impaired. The lower limit of the ratio of the molding work stabilizer is preferably not less than 0.005 parts by weight, more preferably not less than 0.01 parts by weight, and the upper limit is preferably 0.8 parts by weight.

For improving light and weather resistance, it is effective to add a weather resistance improver such as ultraviolet absorber or light stabilizer. One or more types of ultraviolet absorber and light stabilizer can be used.

As ultraviolet absorber, benzophenone-, benzotriazole-, benzoate- and triazine-based compounds are preferably used. As light stabilizer, hindered amine-based compounds, etc., may be used. These weathering resistance improving agents may be used singly or as a mixture of two or more.

In the present invention, it is preferable to use at least one type of ultraviolet absorber.

Preferred examples of such weathering resistance improvers are benzophenone-based, benzotriazole-based and triazine-based ultraviolet absorbers, and hindered amine-based light stabilizers.

Examples of the benzophenone-based compounds are 2,4-dihydroxybenzophenone, 2-hydroxy-4-methoxybenzophenone, 2-hydroxy-4-octyloxybenzophenone, 2-hydroxy-4-dodecyloxybenzophenone, 2-hydroxy-4-octadecyloxybenzophenone, 2,2'-dihydroxy-4-methoxybenzophenone, 2,2'-dihydroxy-4,4'-dimethoxybenzophenone, 2,2',4,4,'-tetrahydroxy-benzophenone, 2-hydroxy-4-methoxybenzophenone-5-sulfonic acid trihydrate, and bis(2-hydroxy-3-benzoyl-6-methoxyphenyl)methane.

Examples of the benzotriazole-based compounds include 2-(2-hydroxy-5-methylphenyl)-2H-benzotriazole, 2-(2-hydroxy-3,5-di-tert-butylphenyl)-2H-benzotriazole, 2-(2-hydroxy-3-tert-butyl-5-methylphenyl)-2H-benzotriazole, 2-(2-hydroxy-5-tert-octylphenyl)-2H-benzotriazole, 2-(3,5-di-tert-octyl-2-hydroxyphenyl)-2H-benzotriazole, 2-(3,5-di-tert-amyl-2-hydroxyphenyl)-2H-benzotriazole, 2-(3-lauryl-5-methyl-2-hydroxyphenyl)-2H-benzotrizole, 2-(3,5-d-tert-butyl-2-hydroxyphenyl)-5-chloro-2H-benzotriazole, 2-(3-tert-butyl-5-methyl-2-hydroxyphenyl)-5-chloro-2H-benzotriazole, 2-(3,5-bis(1-methyl-1-phenylethyl)-2-hydroxyphenyl)-2H-benzotriazole, bis(3-(2H-benzotriazole-2-yl)-2-hydroxy-5-methylphenyl)methane, bis(3-(2H-benzotriazole-2-yl)-2-hydroxy-5-(1,1,3,3-tetramethylbutyl)phenyl)methane, bis(3-(2H-benzotriazole-2-yl)-2-hydroxy-5-cumylphenyl)methane, bis(3-(2H-benzotriazole-2-yl)-2-hydroxy-5-octylphenyl)methane, 1,1-bis(3-(2H-benzotriazole-2-yl)-2-hydroxy-5-methylphenyl) octane, 1,1-bis(3-(2H-5-chlorobenzotriazole-2-yl)-2-hydroxy-5-methylphenyl)octane, 1,2-ethanediyl bis(3-(2H-benzotriazole-2-yl)-2-hydroxybenzoate), 1,12-dodecanediyl bis(3-(2H-benzotriazole-2-yl)-4-hydroxybenzoate), 1,3-cyclohexanediyl bis(3-(5-chloro-2H-benzotriazole-2-yl)-2-hydroxybenzoate), 1,4-butanediyl bis(3-(2H-benzotriazole-2-yl)-4-hydroxy-5-methylphenylethanoate), 3,6-dioxa-1,8-octanediyl bis(3-(5-methoxy-2H-benzotriazole-2-yl)-4-hydroxyphenylethanoate), 1,6-hexanediyl bis(3-(3-(2H-benzotriazole-2-yl)-4-hydroxy-5-tert-butylphenyl) propionate), p-xylenediyl bis(3-(3-(2H-benzotriazole-2-yl)-4-hydroxyphenyl)propionate, bis(3-(2H-benzotriazole-2-yl)-4-hydroxytoluyl)malonate, bis(2-(3-(2H-benzotriazole-2-yl)-4-hydroxy-5-octylphenyl)ethyl) terephthalate, bis(3-(2H-benzotriazole-2-yl)-4-hydroxy-5-propyltoluyl) octadioate, 2-(2H-benzotriazole-2-yl)-6-phthalimidomethyl-4-methylphenol, 2-(2H-benzotriazole-2-yl)-6-phthalimidoethyl-4-methylphenol, 2-(2H-benzotriazole-2-yl)-6-phthalimidooctyl-4-methylphenol, 2-(2H-benzotriazole-2-yl)-6-phthalimidomethyl-4-tert-butylphenol, 2-(2H-benzotriazole-2-yl)-6-phthalimidomethyl-4-cumylphenol, and 2-(2H-benzotriazole-2-yl)-4,6-bis(phthalimidomethyl)phenol.

Examples of the phenyl salicylate-based compounds are phenyl salicylate, and 2,4-di-tert-butylphenyl-3,5-di-tert-butyl-4-hydroxybenzoate.

As the benzoate-based compounds, 2,4-di-tert-butylphenyl-3,5-di-tert-butyl-4-hydroxybenzoate can be cited for instance.

Examples of the triazine-based compounds are 2-(4,6-diphenyl-1,3,5-triazine-2-yl)-5-hexyloxyphenol, 2,4,6-tris-(2,4-dihydroxy-5-hexylphenyl)-sym-triazine, 2,4,6-tris-[2-hydroxy-4-(2-hydroxy-3-nonyloxypropoxy)phenyl]-sym-triazine, 2,4-bis-(2,4-dihydroxyphenyl)-6-[4-(phenylthio) phenyl]-sym-triazine, 2-[2-hydroxy-4-(N,N-bis-hydroxyethyl)-methaneamidoxy]phenyl]-4,6-bis(2,4-dimethylphenyl)-1,3,5-triazine, 2-{4-[4,6-bis(2',4'-dimethylphenyl)-1,3,5-triazine-2-yl]-3-hydroxyphenoxy}-etho-1yl N-(m-isopropenyl-α, α-dimethylbenzyl) carbamate, and 2,4-bis-(2,4-dimethylphenyl)-6-[2-hydroxy-4-(6-carbamoyloxyhexyloxy)phenyl]-1,3,5-triazine.

Examples of the hindered amine-based compounds include bis(2,2,6,6-tetramethyl-4-piperidyl) sebacate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl)-2-(3,5-di-tert-butyl-4-hydroxybenzyl)-2-n-butylmalonate, dimethyl succinate/1-(2-hydroxyethyl)-4-hydroxy-2,2,6,6-tetramethylpiperidine polycondensate, poly[{6-(1,1,3,3-tetramethylbutyl)amino-1,3,5-triazine-2,4-diyl} {(2,2,6,6-tetramethyl-4-piperidyl) imino}hexamethylene, N,N'-bis(3-aminopropyl) ethylenediamine/2,4-bis(N-butyl-N-(1,2,2,6,6-pentamethyl-4-piperidyl)amino)-6-chloro-1,3,5-triazine condensate, tetrakis(2,2,6,6-tetramethyl-4-piperidyl) 1,2,3,4-butanetetracarboxylate, and tetrakis(1,2,2,6,6-pentamethyl-4-piperidyl) 1,2,3,4-butanetetracarboxylate.

Other examples of the weathering resistance improvers include cinnamyl-based compounds such as 2-ethoxy-2'- ethyl-oxalic bisanilide, ethyl 2-cyano-3,3-diphenylacrylate, and 2'-ethylhexyl 2-cyano-3,3-diphenylacrylate.

In the thermoplastic resin composition of the present invention, the weathering resistance improver is used in a ratio of usually 0.001 to 10 parts by weight to 100 parts by weight of the polycarbonate resin. When the ratio of the said improver is less than 0.001 parts by weight, the weathering resistance improving effect proves to be unsatisfactory, and when its ratio is over 10 parts by weight, mechanical properties and heat resistance deteriorate. The lower limit of the amount of the weathering resistance improver used is preferably not less than 0.005 parts by weight, more preferably not less than 0.01 parts by weight, even more preferably not less than 0.05 parts by weight. The upper limit is preferably not more than 5 parts by weight, more preferably not more than 3 parts by weight, even more preferably not more than 1 part by weight.

In the composition of the present invention, it is advisable to use a release agent for enhancing releasability of the composition. As such a release agent, it is possible in the present invention to use the compounds generally known as release agent or lubricant, for example, hydrocarbon compounds, fatty acids and their metal salts, fatty acid esters, fatty acid amide compounds, aliphatic alcohol compounds, polyhydric alcohol compounds, and silicone oil. These compounds may be used singly or as a mixture of two or more.

The "hydrocarbon compounds" mentioned above are the ones which are commonly called wax, and both natural waxes and synthetic waxes can be used in the present invention. Examples of the natural waxes include animal waxes, vegetable waxes, mineral waxes and petroleum waxes. Examples of the synthetic waxes are Fischer-Tropsch wax, polyethylene wax and micro wax. Use of one or more of these waxes is possible. Especially, beeswax, petroleum liquid paraffin, paraffin wax and synthetic polyethylene wax are preferable.

The fatty acids mentioned above are those with a carbon number of not less than 10, such as lauric acid, myristic acid, palmitic acid, stearic acid, montanic acid, oleic acid, linolic acid, and ricinoleic acid. These compounds may be used singly or as a mixture of two or more.

The metal salts of the fatty acids mentioned above are the compounds referred to as metallic soap compounds, such as calcium laurate, calcium stearate, magnesium stearate, lead stearate, zinc stearate, potassium stearate, lithium behenate, strontium behenate, barium behenate, and cesium behenate. These compounds may be used singly or as a mixture of two or more.

The fatty acid amide compounds are the monoamides or bisamides of the above-mentioned fatty acids, which include, for example, capric amides, lauric acid amides, myristic acid amides, palmitic acid amides, stearic acid amides, erucic amides, methylenebisstearic acid amides, ethylenebisstearic acid amides, ethylenebisoleic acid amides, and ethylenebishydroxystearic acid amides These compounds may be used singly or as a mixture of two or more.

The aliphatic alcohol compounds are specifically the aliphatic alcohols with a carbon number of not less than 10, the examples of which are decyl alcohol, dodecyl alcohol, lauryl alcohol, myristyl alcohol, cetyl alcohol, stearyl alcohol, ceryl alcohol, and mirycil alcohol. These compounds may be used singly or as a mixture of two or more.

Examples of the polyhydric alcohol compounds include ethylene glycol, propylene glycol, butylene glycol, hexanediol, polyethylene glycol, polypropylene glycol, glycerin, butanediol, pentanetriol, erithritol, and pentaerithritol. These compounds may be used singly or as a mixture of two or more.

The fatty acid ester compounds are the complete or partial esters obtained from dehydration reactions of the above-mentioned fatty acids, lower fatty-acids such as acetic acid, aromatic carboxylic acids such as benzoic acid, polyvalent acids such as adipic acid, dodecanedionic acid, phthalic acid, trimellitic acid and pyromellitic acid, or oxyacids such as hydroxycaproic acid, with alcohols such as the above-mentioned aliphatic or polyhydric alcohols, lower alcohols such as methanol, or aromatic alcohols such as phenol and benzyl alcohol. Examples of such fatty acid ester compounds are methyl stearate, butyl stearate, butyl laurate, butyl palmitate, butyl montanate, propyl stearate, phenyl stearate, lauryl acetate, stearyl acetate, stearyl laurate, stearyl stearate, behenyl behenate, behenyl benzoate, glycerin monostearate, glycerin tristearate, pentaerithritol tetrastearate, pentaerithritol tetrabehenate, glycerin dilaurate, glycerin monobehenate, pentaerithritol trilaurate, pentaerithritol distearate, and pentaerithritol monobehenate. These compounds may be used singly or as a mixture of two or more.

Examples of the silicone oils are dimethyl silicone oil, phenylmethyl silicone oil, diphenyl silicone oil, and fluorinated alkyl silicone. These silicone oils may be used singly or as a mixture of two or more.

Generally, the release agent used in the present invention needs to have a carbon number of not less than 10. With a compound with a carbon number of less than 10, no satisfactory releasability may be obtained.

Part of the hydrocarbon compounds, for example, polyethylene waxes or ordinary silicone oils generally have poor compatibility with polycarbonates, so that their use is unfavorable where transparency is required.

The presence of a polar group such as carbonyl group, ester group or hydroxyl group in the molecule, as in the fatty acid compounds or fatty acid ester compounds, tends to better compatibility, making it possible to obtain a composition with good transparency.

Addition of the fatty acid amide compounds, metallic salts of fatty acids and fluorine-containing sulfonic acid compounds tends to cause tinting, so that care should be taken in application thereof.

Further, in case of using a compound having a hydroxyl group in the molecule, such as aliphatic alcohol compounds, polyhydric alcohol compounds or partially esterified compounds of fatty acids, deterioration of the polycarbonate may occur due to the presence of a hydroxyl group in the molecule in the molding operations with a long residence time in the molding machine, such as oversize molding. Thus, in these cases, although these compounds have advantageous properties, care should be taken of molding temperature and residence time.

As the release agent used in the present invention, it is preferable to select one or more of the above-exemplified compounds, especially hydrocarbon compounds, fatty acids or metallic salts and fatty acid ester compounds.

The amount of the release agent used in the polycarbonate resin composition of the present invention is usually 0.001 to 1 part by weight in ratio to 100 parts by weight of the polycarbonate resin. When the ratio of the release agent is less than 0.001 parts by weight, the releasability improving effect may be unsatisfactory. It is also undesirable to use the release agent in excess of 1 part by weight because, in this case, there may be produced more minus effects on the other properties than the releasability improving effect. The lower limit of the ratio of the release agent is preferably not less than 0.005 parts by weight, more preferably not less than 0.01 parts by weight, and the upper limit is preferably 0.8 parts by weight.

In the present invention, in order to obtain a polycarbonate resin composition having the specific properties, it is possible to contain a styrene resin (C) and/or a polyester resin (D) in addition to the polycarbonate resin (A) in the base polymer.

The styrene resin (C) used in the present invention may be either a polymer obtained from homopolymerization of styrene monomer(s) or a copolymer of a styrene monomer and other copolymerizable monomer.

Examples of the styrene monomers usable here are styrene, α-methylstyrene, p-methylstyrene and the like, styrene being preferred.

As the monomers copolymerizable with the styrene monomers, there are for instance vinyl cyanide monomers such as acrylonitrile and methacrylonitrile, (meth)acrylic alkyl esters and (meth)acrylic aryl esters such as methyl acrylate, ethyl acrylate, propyl acrylate, phenyl acrylate, methoxyethyl acrylate, methyl methacrylate, ethyl methacrylate, propyl methacrylate, phenyl methacrylate and methoxyethyl methacrylate, maleic acid, maleic anhydride, fumaric acids, maleimide and N-phenylmaleimide. Of these monomers, vinyl cyanide monomers, (meth)acrylic alkyl esters and maleic anhydride are preferred.

The styrene copolymers used in the present invention may be random, graft or alternating. The graft copolymers are preferably the ones obtained by copolymerizing styrene monomers with other monomers in the presence of a rubber. The rubber component may comprise, for instance, diene rubber, acrylic rubber, ethylene/propylene rubber or silicone rubber. Of these, diene rubber and acrylic rubber are preferred.

Examples of diene rubber usable here are polybutadiene, butadiene/styrene copolymer, polyisoprene, butadiene/(meth)acrylic acid lower alkyl ester copolymer, and butadiene/styrene/(meth)acrylic acid lower alkyl ester copolymer. As the (meth)acrylic acid lower alkyl esters, methyl acrylate, ethyl acrylate, methyl methacrylate and ethyl methacrylate can be cited for instance. The ratio of the (meth)acrylic acid lower alkyl ester in the butadiene/(meth) acrylic acid lower alkyl ester copolymer or butadiene/styrene/(meth)acrylic acid lower alkyl ester copolymer is preferably not more than 30% of the rubber weight.

Typical examples of the acrylic rubbers are alkyl acrylate rubbers, in which the carbon number of the alkyl group is preferably 1 to 8. Examples of the alkyl acrylate rubbers are ethyl acrylate, butyl acrylate and ethylhexyl acrylate. Any preferable crosslinkable ethylenic unsaturated monomers may be used for the alkyl acrylate rubbers, and as the crosslinking agent, there can be used, for instance, alkylenediol, di(meth)acrylate, polyester di(meth)acrylate, divinylbenzene, trivinylbenzene, triallyl cyanurate, allyl (meth)acrylate, butadiene and isoprene. The core-shell type polymers having crosslinked diene rubber as core can also be used as acrylic rubber.

The styrene copolymers used in the present invention may be random, graft or alternating. AS resins can be cited as examples of the random polymers. Examples of the styrene graft copolymers are HIPS resins, ABS resins, AES resins and AAS resins. Exemplary of the alternating polymers is styrene/maleic anhydride alternating copolymer (known as ultra-heat-resistant polystyrene resin).

These styrene copolymers can be obtained by the known polymerization methods such as emulsion polymerization method, solution polymerization method, suspension polymerization method and bulk polymerization method.

The styrene resins (C) usable in the present invention can be used singly or as a mixture of two or more.

The ratios of the polycarbonate resin (A) and the styrene resin (C) in the polycarbonate resin composition of the present invention are usually 95 to 5 parts by weight for (A) and 5 to 95 parts by weight for (C) (total weight parts of (A) and (C) is 100 parts). When the styrene resin (C) is less than 5 parts by weight, the fluidity improving effect may be unsatisfactory, and when it exceeds 95 parts by weight, heat resistance may be insufficient. The lower limit of the ratio of the styrene resin (C) is preferably not less than 6 parts by weight, more preferably not less than 7 parts by weight, and the upper limit is preferably not more than 70 parts by weight, more preferably not more than 60 parts by weight, especially preferably not more than 50 parts by weight.

The amount of siloxane compound (B) to 100 parts by weight of (A) and (C) combined is usually 0.001 to 20 parts by weight.

In the polycarbonate resin composition having blended therein a styrene resin or styrene resins such as mentioned above, it is possible to further contain the said molding work stabilizer, weathering resistance improver, release agent, etc., according to the purpose of use of the composition.

As the polyester resin (D) used in the present invention, any polyesters comprising a dicarboxylic acid component and a diol component and having ester linkage can be used.

Examples of the said carboxylic acids include aromatic dicarboxylic acids, alicyclic dicarboxylic acids, aliphatic dicarboxylic acids and oxyacids. Of these, aromatic dicarboxylic acids are preferred. Examples of the aromatic dicarboxylic acids include phthalic acid, isophthalic acid, terephthalic acid, diphenyldicarboxylic acid, naphthalenedicarboxylic acid, diphenoxyethanedicarboxylic acid, and diphenyletherdicarboxylic acid.

The said alicyclic dicarboxylic acids include nuclear hydrogenated compounds of the said aromatic dicarboxylic acids such as hexahydroterephthalic acid and hexahydroisophthalic acid. The said aliphatic dicarboxylic acids include succinic acid, glutaric acid, adipic acid, suberic acid, azelaic acid, sebasic acid, and dodecanedionic acid. The said oxyacids include hydroxybenzoic acid and hydroxycaproic acid. These dicarboxylic acids can be used as a combination of two or more as desired.

Among these dicarboxylic acids, phthalic acid, isophthalic acid, terephthalic acid and naphthalenedicarboxylic acid are preferred. Of these, terephthalic acid and naphthalenedicarboxylic acid are more preferable.

The diols usable for the said polyester resins include aliphatic diols, alicyclic diols, aromatic diols, and ethylene oxide adducts of aromatic diols. Of these, aliphatic diols are preferred.

Examples of the aliphatic diols are ethylene glycol, 1,2-propanediol, 1,3-propanediol, 1,4-butanediol, 1,5-pentanediol, 1,6-hexanediol, 1,2-decanediol, 1,10-decanediol, neopentyl glycol, and polyalkylene glycols such as diethylene glycol, triethylene glycol, polyethylene glycol, polypropylene glycol and polytetramethylene glycol.

Examples of the alicyclic diols are 1,2-cyclohexanediol, 1,4-cyclohexanediol, 1,1-cyclohexanedimethanol, and 1,4-cyclohexanedimethanol.

Examples of the aromatic diols are 2,2-bis(4-hydroxyphenyl)propane, bis(4-hydroxyphenyl)methane, 1,1-bis(4-hydroxyphenyl)ethane, 2,2-bis(4-hydroxy-3-methylphenyl)propane, 1,1-bis(4-hydroxyphenyl)-1-phenylethane, and 1,1-bis(4-hydroxyphenyl) cyclohexane.

Examples of the ethylene oxide adducts of aromatic diols are 2,2-bis(4-β-hydroxyethoxyphenyl)propane and bis(4-β-hydroxyethoxyphenyl)sulfone.

If necessary, two or more of the said diols may be used in admixture. Among the above-mentioned diols, ethylene glycol and 1,4-butanediol are preferable.

As the polyester (D) resin in the present invention, one or more of those selected from the group consisting of poly(ethylene terephthalate) resins, poly(propylene terephthalate) resins, poly(butylene terephthalate) resins, polyarylate resins and polyester resins having cyclohexane rings (e. g. poly(cyclohexanedimethyl terephthalate) resin) are preferably used. These resins are easily available as general-purpose resins.

The molecular weight of the polyester resin (D) used in the present invention is not specifically defined, but it is usually 0.3 to 2.0 dl/g, preferably 0.5 to 1.5 dl/g as intrinsic viscosity measured in a 5/5 tetrachloroethane/phenol mixed solvent at 30° C.

The ratios of the polycarbonate resin (A) and the polyester resin (D) in the polycarbonate resin composition of the present invention are usually 95 to 5 parts by weight for (A) and 5 to 95 parts by weight for (D). When the polyester resin is less than 5 parts by weight, the chemical resistance improving effect may be unsatisfactory, and when it exceeds 95 parts by weight, the obtained composition may be low in heat resistance. The lower limit of the ratio of the polyester resin is preferably not less than 10 parts by weight, more preferably not less than 15 parts by weight, even more preferably not less than 20 parts by weight. The upper limit is preferably not more than 70 parts by weight, more preferably not more than 60 parts by weight, even more preferably not more than 50 parts by weight.

The amount of siloxane compound (B) to 100 parts by weight of (A) and (D) combined is usually 0.001 to 20 parts by weight.

In the present invention, copolymerized polyester resins (E) can be used as the polyester resin. The copolymerized polyester resins (E) usable in the present invention are the ones which comprise preferably at least two kinds of dicarboxylic acid components and a diol component, in which 1 to 50 mol % of the dicarboxylic acid components is constituted by a naphthalenedicarboxylic acid component. Such copolymerized polyester resins (E) can be obtained, for instance, by a method which comprises copolymerizing a naphthalenedicarboxylic acid, other type of dicarboxylic acid(s), and a diol. The naphthalenedicarboxylic acid and other type of dicarboxylic acid(s) may be replaced by their ester-forming derivatives.

As the naphthalenedicarboxylic acid, various types of isomers such as 2,6-naphthalenedicarboxylic acid, 2,7-naphthalenedicarboxylic acid, 2,3-naphthalenedicarboxylic acid, 1,8-naphthalenedicarboxylic acid, 1,7-naphthalenedicarboxylic acid, 1,6-naphthalenedicarboxylic acid, 1,5-naphthalenedicarboxylic acid, 1,4-naphthalenedicarboxylic acid, 1,3-naphthalenedicarboxylic acid, and 1,2-naphthalenedicarboxylic acid can be used. Single or combined use of these naphthalenedicarboxylic acid isomers is possible. Among the said isomers, 2,6-naphthalenedicarboxylic acid is especially preferred for the purpose.

Examples of the dicarboxylic acids other than naphthalenedicarboxylic acids include aromatic dicarboxylic acids, alicyclic dicarboxylic acids, aliphatic dicarboxylic acids and oxyacids. Of these, aromatic dicarboxylic acids are preferable. Examples of the aromatic dicarboxylic acids are phthalic acid, isophthalic acid, terephthalic acid, diphenyldicarboxylic acid, diphenoxyethanedicarboxylic acid, and diphenylether dicarboxylic acid.

Examples of the alicyclic dicarboxylic acids include nuclear hydrogenated compounds of the above-mentioned aromatic dicarboxylic acids, such as hexahydroterephthalic acid and hexahydroisophthalic acid.

The aliphatic dicarboxylic acids include succinic acid, glutaric acid, adipic acid, suberic acid, azelaic acid, sebacic acid, and dodecanedionic acid.

Hydroxybenzoic acid and hydroxycaproic acid can be cited as examples of the oxyacids.

These dicarboxylic acids may be used either singly or as a combination of two or more. Among these dicarboxylic acids, phthalic acid, isophthalic acid and terephthalic acid are preferable, with terephthalic acid being more preferable.

Examples of the diols include aliphatic diols, alicyclic diols, aromatic diols, and ethylene oxide adducts of aromatic diols. Aliphatic diols are preferable.

Examples of such aliphatic diols are ethylene glycol, 1,2-propanediol, 1,3-propanediol, 1,4-butanediol, 1,5-pentanediol, 1,6-hexanediol, 1,2-decanediol, 1,10-decanediol, and neopentyl glycol.

Examples of the polyalkylene glycols are diethylene glycol, triethylene glycol, polyethylene glycol, polypropylene glycol, and polytetramethylene glycol.

Examples of the alicyclic diols are 1,2-cyclohexanediol, 1,4-cyclohexanediol, 1,1-cyclohexanedimethanol, and 1,4-cyclohexanedimethanol.

Examples of the aromatic diols are 2,2-bis(4-hydroxyphenyl)propane, bis(4-hydroxyphenyl)methane, 1,1-bis(4-hydroxyphenyl)ethane, 2,2-bis(4-hydroxy-3-methylphenyl)propane, 1,1-bis(4-hydroxyphenyl)-1-phenylethane, and 1,1-bis(4-hydroxyphenyl)cyclohexane.

Examples of the ethylene oxide adducts of aromatic diols are 2,2-bis(4-β-hydroxyethoxyphenyl)propane and bis(4-β-hydroxyethoxyphenyl)sulfone. These diols may be used singly or as a mixture of two or more. Among these diols, ethylene glycol, 1,3-propanediol and 1,4-butanediol are preferable, with ethylene glycol being more preferable.

The ratio of naphthalenedicarboxylic acid in the dicarboxylic acid component in the copolymerized polyester resin is usually 1 to 50 mol % When this ratio is less than 1 mol %, the chemical resistance improving effect may be unsatisfactory, and when the ratio exceeds 50 mol %, transparency may deteriorate. The lower limit of the ratio of naphthalenedicarboxylic acid in the dicarboxylic acid component is preferably not less than 2 mol %, more preferably not less than 4 mol %, especially preferably not less than 6 mol %. The upper limit is preferably not more than 50 mol %, more preferably not more than 45 mol %, even more preferably not more than 40 mol %, most preferably not more than 25 mol %.

The molecular weight of the copolymerized polyester resin in the present invention is not specifically defined, but it is usually 0.3 to 2.0 dl/g, preferably 0.4 to 1.5 dl/g, more preferably 0.5 to 1.4 dl/g as intrinsic viscosity measured in a 5/5 tetrachloroethane/phenol mixed solvent at 30° C.

The ratios of the polycarbonate resin (A) and the copolymerized polyester resin (E) in the polycarbonate resin composition of the present invention are usually 99.9 to 50 parts by weight for (A) and 0.1 to 50 parts by weight for (E). When the copolymerized polyester resin is less than 0.1 parts by weight, the chemical resistance improving effect may be unsatisfactory, and when it exceeds 50 parts by weight, the produced composition may be poor in heat resistance. The lower limit of the ratio of copolymerized polyester resin is preferably not less than 0.2 parts by weight, more preferably not less than 0.5 parts by weight, and the upper limit is preferably not more than 40 parts by weight, more preferably not more than 20 parts by weight.

The amount of siloxane compound (B) to 100 parts by weight of (A) and (E) combined is usually 0.001 to 20 parts by weight.

In the thermoplastic resin composition containing the said styrene resin (C), the said polyester resin (D) or the said copolymerized polyester resin (E), it is also advisable to contain a molding work stabilizer, weathering resistance improver, release agent, etc., such as mentioned above, according to the purpose of use of the composition.

Further, in the thermoplastic resin composition of the present invention, in order to provide the desired characteristics, it is possible to contain one or more of other polymers than the polyolefinic resins, impact resistance improver, antistatic agent, plasticizer, compatibilizing agent, reinforcing agents or fillers such as glass fiber, glass beads, glass flakes, carbon fiber, fibrous magnesium, potassium titanate whisker, ceramic whisker, mica, talc, etc., and colorants, etc.

As means for producing the thermoplastic resin composition according to the present invention, a method can be used, for instance, in which the starting materials are blended and kneaded at any suitable stage in the process till the start of final molding. Blending may be effected, for instance, by mixing the materials by a tumbler, Henschel mixer, or such means, or by supplying the measured amounts of the materials to an extruder hopper by a feeder and mixing the materials. Kneading may be performed by using a single-screw or twin-screw extruder or like means.

The thermoplastic resin compositions of the present invention can be molded into the desired products by the conventional molding methods such as injection molding, blow molding, etc. The molded products of the thermoplastic resin compositions of the present invention can be used for many applications, such as sheets, films, miscellaneous goods, parts of domestic electrical appliances, automobile parts, building materials, hollow ware, etc.

The thermoplastic resin compositions of the present invention excel polycarbonate resins in fluidity, are low in haze, hence excellent in transparency, and also have high heat and impact resistance, so that they are useful for various applications where transparency as well as fluidity, heat resistance and impact resistance are required.

EXAMPLES

The present invention will be described in further detail with reference to the examples thereof, which examples however are merely intended to be illustrative and not to be construed as limiting the scope of the invention. The following methods of evaluation were used in the Examples and the Comparative Examples.

(1) Transparency (Haze):

Haze of the test pieces (3 mm thickness) was measured according to JIS K6714.

(2) Fluidity (Q-Value):

Resin effusion rate (cc/s) from a 1 mm$\phi$, 10 mm long nozzle under a load of 160 kgf/cm$^2$ at 280° C. was measured using a Koka-type flowtester. In Examples 46 to 51 and Comparative Examples 16 to 19, the measurements were made at 240° C.

(3) Tensile Strength (MPa) and Deflection Temperature Under Load (DTUL):

Tensile strength was measured at 23° C. according to ASTM D638, and deflection temperature under load was measured under a load of 1.82 MPa according to ASTM D648.

(4) BF Length (mm):

Molding was conducted using a 2 mm thickness bar flow mold under the conditions of: resin temperature=280° C.; mold temperature=80° C.; injection pressure=1,500 kgf/cm$^2$; molding cycle time=45 sec, and evaluation was made by the mean value of bar flow length of 15 specimens. The more the value, the better the fluidity.

(5) Impact Resistance (Izod Impact Strength (J/m)):

This was measured by the notched Izod impact test method using 3.2 mm thickness test pieces according to ASTM D256.

(6) Yellowness (YI):

Yellowness was measured according to JIS K7105 using 3 mm thickness test pieces.

(7) Molding Work Stability:

Injection molding was carried out at a resin temperature of 300° C., a mold temperature of 80° C. and a molding cycle of 10 minutes, and molding work stability was evaluated according to whether silver streaking occurred or not. "Silver streaking" is an undesirable phenomenon of formation of silver-color streaks on the surface of the molded product. In the table, "A" indicates that no silver streaking occurred. "B" indicates that occurrence of silver streaking was observed, and "C" indicates that silver streaking occurred heavily.

(8) Weathering Resistance:

Each 3 mm thickness test piece was subjected to 1,000-hour treatment with a strong energy xenon weatherometer Model XEL-3W mfd. by Suga Testing Machinery Co., Ltd., and the degree of yellowness ($\Delta$YI) after the treatment was measured according to JIS K7105.

(9) Releasability:

Cup-shaped products were injection molded at a resin temperature of 280° C. and a mold temperature of 80° C. under an in-mold pressure of 550 Kgf/cm$^2$ and evaluated. Also, the value of release resistance (Kgf) during release from the mold was determined. In the table, "A" indicates that it was easy to release the molded product, and "C" indicates that it was difficult to release the molded product.

(10) Bending Modulus (MPa):

Measured at 23° C. according to ASTM D790.

(11) Chemical Resistance 1:

A test chemical substance was applied to a 6.4 mm thick bending test piece loaded with a deflection of a given deformation factor, and 48 hours later, threshold stress was calculated from the amount of deflection that started cracking. A water-soluble cutting oil (Gryton M1700 produced by Toho Chemical Co., Ltd.) was used as the test chemical substance. Evaluation was made according to the following four-grade rating formula:

A: Threshold stress was not less than 240 kgf/cm$^2$.

B: Threshold stress was not less than 160 kgf/cm$^2$.

C: Threshold stress was not less than 80 kgf/cm$^2$.

D: Threshold stress was less than 80 kgf/cm$^2$.

(12) Chemical Resistance 2:

A test chemical substance was applied to a 3.2 mm thick tensile test piece loaded with a deflection of 1% deformation factor, and 48 hours later, retention of elongation at break (ratio to the test piece to which the test chemical substance was not applied) was measured. Di(2-ethylhexyl) phthalate (produced by Tokyo Kasei Kogyo Co., Ltd) was used as the test chemical substance. Evaluation was made according to the following four-grade rating formula:

A: Retention of elongation at break was not less than 75%.

B: Retention of elongation at break was not less than 50% but less than 75%.

C: Retention of elongation at break was not less than 25% but less than 50%.

D: Retention of elongation at break was less than 25%.

Listed below are the starting materials used in the Examples and the Comparative Examples.

(1) Polycarbonate resin: produced by Mitsubishi Engineering-Plastics Corporation, trade name: Iupilon S-2000 (viscosity-average molecular weight: 25,000)

(2) Polycarbonate resin: produced by Mitsubishi Engineering-Plastics Corporation, trade name: Iupilon H-3000 (viscosity-average molecular weight: 19,000)

(3) Polycarbonate resin: produced by Mitsubishi Engineering-Plastics Corporation, trade name: Iupilon E-2000 (viscosity-average molecular weight: 27,000)

(4) Polycarbonate resin: produced by Mitsubishi Engineering-Plastics Corporation, trade name: Iupilon H-4000 (viscosity-average molecular weight: 15,000)

(5)-(19) Siloxane compounds A-N: Produced by Nippon Unicar Company Limited, (See Table 1 below).

TABLE 1

| Ratios of the bifunctional structural units (W) in the siloxane compound | Siloxane compounds | | | | |
|---|---|---|---|---|---|
| (substituent groups/ratio) | A | B | C | D | E |
| unit A (aliphatic) | — | — | A-1 0.18 | — | — |
| unit B (aromatic) | B-1 0.6 | B-1 0.54 | B-1 0.55 | B-1 0.55 | B-1 0.73 |
| unit C (ester) | C-1a 0.22 | C-1a 0.18 | C-1a 0.21 | — | — |
| unit C (ether) | — | — | — | C-2b 0.16 | C-2c 0.08 |
| unit D (phosphorus) | D-1 0.18 | D-1 0.27 | D-2 0.06 | D-1 0.19 | D-1 0.19 |
| Viscosity (mPa/s) | 1270 | 620 | 690 | 70 | 90 |

| Ratios of the bifunctional structural units (W) in the siloxane compound | Siloxane compounds | | | | |
|---|---|---|---|---|---|
| (substituent groups/ratio) | F | G | H | I | J |
| unit A (aliphatic) | A-1 0.53 | A-1 0.06 | — | A-1 0.25 | — |
| unit B (aromatic) | B-2 0.28 | B-1 0.50 | B-1 0.81 | B-2 0.33 | B-1 1.0 |
| unit C (ester) | C-1b 0.07 | C-1a 0.07 | C-1a 0.07 | C-1a 0.25 | — |
| unit C (ether) | — | C-2a 0.13 | — | — | — |
| unit D (phosphorus) | D-2 0.12 | D-3 0.24 | D-1 0.12 | D-1 0.17 | — |
| Viscosity (mPa/s) | 330 | 160 | 1710 | 4600 | 70 |

| Ratios of the bifunctional structural units (W) in the siloxane compound | Siloxane compounds | | | | |
|---|---|---|---|---|---|
| (substituent groups/ratio) | K | L | M | N | Q |
| unit A (aliphatic) | A-1 0.58 | A-1 0.74 | A-1 0.07 | — | A-1 0.17 |
| unit B (aromatic) | — | — | B-1 0.79 | B-1 0.75 | B-1 0.20 |
| unit C (ester) | C-1a 0.42 | — | — | C-1a 0.25 | C-1b 0.33 |
| unit C (ether) | — | — | — | — | — |
| unit D (phosphorus) | — | D-1 0.26 | D-1 0.15 | — | D-2 0.30 |
| Viscosity (mPa/s) | 340 | 90 | 570 | 250 | 450 |

The ratios of the structural units in Table 1 were calculated from the measurement data obtained from $^1$H-NMR analyses and shown by molar contents (mol/mol). The values of viscosity shown in the table are those measured at 50° C.

Symbols A-1, B-1, B-2, C-1a, C-1b, C-2a, C-2b, C-2c, D-1, D-2 and D-3 used in Table 1 stand for the following substituent groups:

A-1

B-1

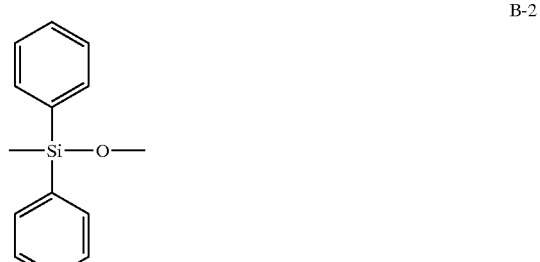

B-2

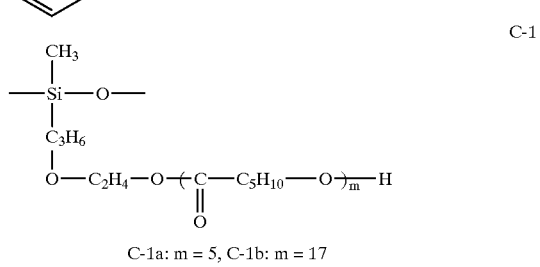

C-1

C-1a: m = 5, C-1b: m = 17

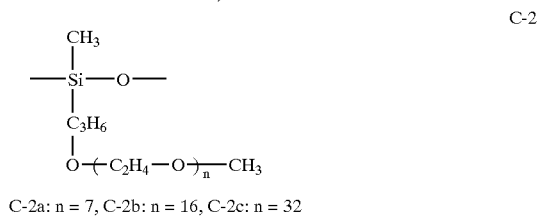

C-2

C-2a: n = 7, C-2b: n = 16, C-2c: n = 32

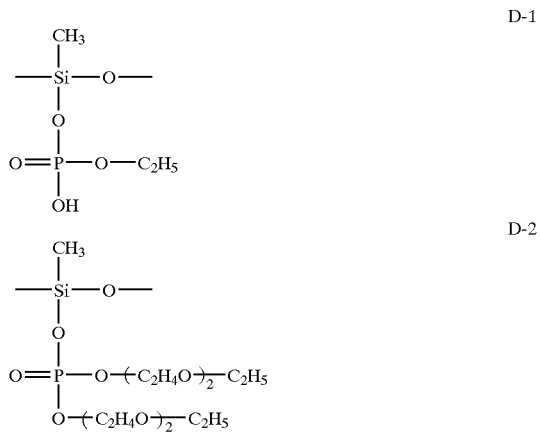

D-1

D-2

-continued

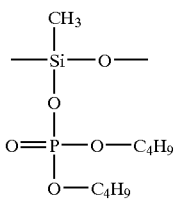

D-3

(20) Siloxane compound O: polydimethylsiloxane produced by Nippon Unicar Company Limited, trade name: L-45
(21) Siloxane compound P: methyltrimethoxysilane produced by Nippon Unicar Company Limited, trade name: A-163
(22) PCL: polycaprolactone produced by Daicel Chemical Industries, Ltd., trade name: Placcel H1P (molecular weight: 10,000)
(AO-1) (stabilizer): bis(2,6-di-tert-butyl-4-methylphenyl) pentaerithritol diphosphite produced by Asahi Denka Co., Ltd., trade name: Adeka Stab PEP-36
(AO-2) (stabilizer): tris(2,4-di-tert-butylphenyl) phosphite produced by Asahi Denka Co., Ltd., trade name: Adeka Stab 2112
(AO-3) (stabilizer): mixture of monostearyl acid phosphate and distearyl acid phosphate produced by Asahi Denka Co., Ltd., trade name: Adeka Stab AX-71
(AO-4) (stabilizer): pentaerithrityl-tetrakis(3-(3,5-di-tert-butyl-4-hydroxyphenyl) propionate) produced by Ciba Specialty Chemicals Co., Ltd., trade name: Irganox 1010
(AU-1) (weathering resistance improver): 2-(2-hydroxy-5-tert-octylphenyl)-2H-benzotriazole produced by Shipro Kasei Kaisha, Ltd., trade name: SEESORB 709
(AU-2) (weathering resistance improver): bis(3–2H-benzotriazole-2-yl)-2-hydroxy-5-tert-octylphenyl) methane produced by Asahi Denka Co., Ltd., trade name: Adeka Stab LA-31
(RA-1) (release agent): behenyl behenate
(RA-2) (release agent): stearyl stearate
(RA-3) (release agent): beeswax
(RA-4) (release agent): pentaerithritol tetrastearate
(RA-5) (release agent): glycerin monostearate
(RA-6) (release agent): stearic acid
(RA-7) (release agent): paraffin wax produced by NIPPON SEIRO CO., LTD., trade name: 155
(Polystyrene resin): product by Mitsubishi Chemical Corporation, trade name: Diarex® HH-102
(Ultra-heat-resistant polystyrene resin): product by SEKISUI PLASTICS CO., LTD., trade name: Dyrak® D-232
(HIPS resin): product by Mitsubishi Chemical Corporation, trade name: Diarex® HT-478
(ABS resin): product by Nippon A & L, Inc., trade name: Santac® UT-61
(Fluidity improver): polycaprolactone produced by Daicel Chemical Industries, Ltd., trade name: Placcel H1P (molecular weight: 10,000)
(Polyethylene terephthalate resin): product by Mitsubishi Chemical Corporation, trade name: Novapex® TGS83A (intrinsic viscosity: 0.83)
(Polybutylene terephthalate resin): product by Mitsubishi Engineering-Plastics Corporation, trade name: Novadur® 5008 (intrinsic viscosity: 0.85)
(Polyethylene naphthalate resin): product by Mitsubishi Chemical Corporation, trade name: Novax® FS405Z (intrinsic viscosity: 0.70)
(Copolymerized polyester resin): product by Mitsubishi Chemical Corporation, trade name: Novapex® NC102Z copolymerized polyethylene terephthalate resin with 8 mol % naphthalenedicarboxylic acid ester unit, intrinsic viscosity: 0.81)
(Copolymerized polyester resin): product by Mitsubishi Chemical Corporation, trade name: Novapex® N10PET (polyethylene terephthalate resin with 10 mol % naphthalenedicarboxylic acid ester unit, intrinsic viscosity: 0.80)
(Copolymerized polyester resin): product by Mitsubishi Chemical Corporation, trade name: Novapex® N31PET (copolymerized polyethylene terephthate resin with 31 mol % naphthalenedicarboxylic acid ester unit, intrinsic viscosity: 0.50)

Examples 1–17 and Comparative Examples 1–12

Polycarbonate resins (PC) and the siloxane compounds or PCL shown in Tables 2 and 3 were mixed at the ratios shown in the tables by a Henschel mixer or a tumbler and extruded from a 65 mm$\phi$ single-screw vented extruder at a barrel temperature of 270° C. to produce pellets. These pellets were dried in a hot-air dryer at 120° C. for more than 5 hours and then injection molded at a resin temperature of 280° C. and a mold temperature of 80° C. to prepare the test pieces for determining the properties, and the test pieces were subjected to evaluations, obtaining the results shown in Table 2.

TABLE 2

|  | Ex. 1 | Ex. 2 | Ex. 3 | Ex. 4 | Ex. 5 |
|---|---|---|---|---|---|
| Composition kind/amount (wt. parts) | | | | | |
| PC | S-2000 (100) | S-2000 (100) | S-2000 (100) | S-2000 (100) | S-2000 (100) |
| Siloxane compound | A (0.2) | A (0.5) | A (1.0) | A (4.0) | A (10.0) |
| PCL | — | — | — | — | — |
| Properties | | | | | |
| Haze (%) | 0.5 | 0.4 | 0.4 | 0.4 | 0.5 |
| Q-value ($\times 10^{-2}$ cc/s) | 7.2 | 9.3 | 13.3 | 59.6 | 127.7 |
| Tensile strength (MPa) | 70 | 71 | 66 | 51 | 50 |
| DTUL (° C.) | 133 | 132 | 129 | 116 | 109 |

|  | Ex. 6 | Ex. 7 | Ex. 8 | Ex. 9 | Ex. 10 |
|---|---|---|---|---|---|
| Composition kind/amount (wt. parts) | | | | | |
| PC | S-2000 (100) | S-2000 (100) | S-2000 (100) | S-2000 (100) | S-2000 (100) |
| Siloxane compound | B (1.0) | C (1.0) | D (1.0) | E (1.0) | F (1.0) |
| PCL | — | — | — | — | — |
| Properties | | | | | |
| Haze (%) | 0.4 | 0.4 | 0.4 | 0.4 | 0.4 |
| Q-value ($\times 10^{-2}$ cc/s) | 15.3 | 9.9 | 18.5 | 15.6 | 9.8 |

TABLE 2-continued

|  | | | | | |
|---|---|---|---|---|---|
| Tensile strength (MPa) | 70 | 71 | 71 | 71 | 68 |
| DTUL (° C.) | 133 | 130 | 131 | 131 | 126 |

|  | Ex. 11 | Ex. 12 | Ex. 13 | Ex. 14 | Ex. 15 |
|---|---|---|---|---|---|
| Composition kind/amount (wt. parts) | | | | | |
| PC | S-2000 (100) | S-2000 (100) | S-2000 (100) | S-2000 (100) | H-4000 (100) |
| Siloxane compound | G (1.0) | H (1.0) | I (1.0) | A/H (0.5/0.5) | A (1.0) |
| PCL | — | — | — | — | — |
| Properties | | | | | |
| Haze (%) | 0.5 | 0.8 | 0.5 | 0.7 | 0.4 |
| Q-value (× $10^{-2}$ cc/s) | 15.8 | 8.0 | 9.6 | 9.1 | 71.6 |
| Tensile strength (MPa) | 66 | 68 | 68 | 70 | 46 |
| DTUL (° C.) | 127 | 124 | 127 | 129 | 120 |

|  | Ex. 16 | Ex. 17 | Comp. Ex. 1 | Comp. Ex. 2 | Comp. Ex. 3 |
|---|---|---|---|---|---|
| Composition kind/amount (wt. parts) | | | | | |
| PC | H-3000 (100) | E-2000 (100) | S-2000 (100) | S-2000 (100) | S-2000 (100) |
| Siloxane compound | A (2.0) | A (2.0) | — | J (1.0) | K (1.0) |
| PCL | — | — | — | — | — |
| Properties | | | | | |
| Haze (%) | 0.4 | 0.5 | 0.5 | 2.8 | 87.3 |
| Q-value (× $10^{-2}$ cc/s) | 36.0 | 7.9 | 5.0 | 5.1 | 5.2 |
| Tensile strength (MPa) | 61 | 69 | 70 | 71 | 70 |
| DTUL (° C.) | 120 | 125 | 135 | 131 | 130 |

|  | Comp. Ex. 4 | Comp. Ex. 5 | Comp. Ex. 6 | Comp. Ex. 7 | Comp. Ex. 8 |
|---|---|---|---|---|---|
| Composition kind/amount (wt. parts) | | | | | |
| PC | S-2000 (100) | S-2000 (100) | S-2000 (100) | S-2000 (100) | S-2000 (100) |
| Siloxane compound | L (1.0) | M (1.0) | N (1.0) | O (0.5) | P (1.0) |
| PCL | — | — | — | — | — |
| Properties | | | | | |
| Haze (%) | 99.3 | 41.3 | 9.3 | 92.8 | 83.1 |
| Q-value (× $10^{-2}$ cc/s) | 9.7 | 7.8 | 5.2 | 5.6 | 5.6 |
| Tensile strength (MPa) | 60 | 67 | 71 | 67 | 69 |
| DTUL (° C.) | 130 | 129 | 130 | 134 | 133 |

|  | Comp. Ex. 9 | Comp. Ex. 10 | Comp. Ex. 11 | Comp. Ex. 12 |
|---|---|---|---|---|
| Composition kind/amount (wt. parts) | | | | |
| PC | S-2000 (100) | H-4000 (100) | H-3000 (100) | E-2000 (100) |
| Siloxane compound | — | — | — | — |
| PCL | 1.0 | — | — | — |
| Properties | | | | |
| Haze (%) | 0.5 | 0.3 | 0.3 | 0.5 |
| Q-value (× $10^{-2}$ cc/s) | 6.1 | 39.8 | 15.0 | 2.4 |
| Tensile strength (MPa) | 66 | 53 | 66 | 71 |
| DTUL (° C.) | 128 | 126 | 128 | 136 |

Example 18 and Comparative Example 13

A siloxane compound A shown in Table 3 was added (Example 18) or not added (Comparative Example 13) to a polycarbonate resin, and they were mixed at the ratios shown in the table by a Henschel mixer or a tumbler, and extruded from a 65 mmφ single-screw vented extruder at a barrel temperature of 270° C. to produce pellets: These pellets were dried in a hot-air dryer at 120° C. for more than 5 hours and then injection molded at a resin temperature of 280° C. and a mold temperature of 80° C. to prepare the test pieces for determining the properties, and the test pieces were evaluated to obtain the results shown in Table 3.

TABLE 3

|  | Ex. 18 | Comp. Ex. 13 |
|---|---|---|
| Composition kind/amount (wt. parts) | | |
| PC | S-2000 (100) | S-2000 (100) |
| Siloxane compound | A (2.0) | — |
| Properties | | |
| Haze (%) | 0.4 | 0.5 |
| Q-value (× $10^{-2}$ cc/s) | 15.5 | 5.0 |
| BF length (mm) | 286 | 121 |
| Izod impact strength (J/m) | 720 | 796 |

Examples 19–23

Polycarbonate resins and the siloxane compounds shown in Table 4 were mixed at the ratios shown in the table by a Henschel mixer or a tumbler, and extruded from a 65 mmφ single-screw vented extruder at a barrel temperature of 270° C. to produce pellets. These pellets were dried in a hot-air dryer at 120° C. for more than 5 hours and then injection molded at a resin temperature of 280° C. and a mold temperature of 80° C. to prepare the test pieces for determining the properties. Evaluation results are shown in Table 4.

TABLE 4

|  | Ex. 19 | Ex. 20 | Ex. 21 | Ex. 22 | Ex. 23 |
|---|---|---|---|---|---|
| Composition kind/amount (wt. parts) | | | | | |
| PC | S-2000 (100) | S-2000 (100) | S-2000 (100) | S-2000 (100) | S-2000 (100) |
| Siloxane compound | Q (0.5) | Q (1.0) | Q (1.5) | Q (2.0) | Q (3.0) |
| PCL | — | — | — | — | — |
| Properties | | | | | |
| Haze (%) | 0.40 | 0.48 | 0.70 | 0.80 | 1.00 |
| Q-value ($\times 10^{-2}$ cc/s) | 12.2 | 22.3 | 30.9 | 44.8 | 92.1 |
| Tensile strength (MPa) | 83 | 82 | 79 | 56 | 31 |
| DTUL (° C.) | 129 | 125 | 122 | 119 | 113 |

Examples 24–32

Polycarbonate resins and the siloxane compounds or stabilizers shown in Table 5 were mixed at the ratios shown in the table by Henschel mixer or a tumbler, and extruded from a 65 mmφ single-screw vented extruder at a barrel temperature of 270° C. to produce pellets. These pellets were dried in a hot-air dryer at 120° C. for more than 5 hours and then injection molded at a resin temperature of 280° C. and a mold temperature of 80° C. to prepare the test pieces for determining the properties. Evaluation results are shown in Table 5.

TABLE 5

|  | Ex. 24 | Ex. 25 | Ex. 26 | Ex. 27 | Ex. 28 |
|---|---|---|---|---|---|
| Composition kind/amount (wt. parts) | | | | | |
| PC | S-2000 (100) | S-2000 (100) | S-2000 (100) | S-2000 (100) | S-2000 (100) |
| Siloxane compound | A (0.2) | A (0.5) | A (4) | C (1) | H (0.5) |
| Stabilizer | AO-1 (0.01) | AO-2 (0.05) | AO-3 (0.5) | AO-1 (0.1) | AO-2 (0.04) |
| Properties | | | | | |
| Haze (%) | 0.4 | 0.4 | 0.4 | 0.4 | 0.6 |
| Q-value ($\times 10^{-2}$ cc/s) | 7.3 | 9.5 | 61.4 | 10.5 | 6.7 |
| Yellowness Molding work stability | 1.6 | 1.5 | 1.3 | 1.4 | 2.7 |
| Silver streaking | A | A | A | A | A |
| Yellowness | 2.0 | 1.8 | 1.4 | 1.5 | 2.9 |

|  | Ex. 29 | Ex. 30 | Ex. 31 | Ex. 32 |
|---|---|---|---|---|
| Composition kind/amount (wt. parts) | | | | |
| PC | S-2000 (100) | S-2000 (100) | S-2000 (100) | S-2000 (100) |
| Siloxane compound | D (1) | A (1) | A (1) | A (1) |
| Stabilizer | AO-1/AO-4 (0.02/0.02) | AO-2/AO-3 (0.05/0.03) | AO-3/AO-4 (0.1/0.05) | AO-2/AO-3/AO-4 (0.05/0.05/0.03) |

TABLE 5-continued

| Properties | | | | |
|---|---|---|---|---|
| Haze (%) | 0.4 | 0.4 | 0.4 | 0.4 |
| Q-value ($\times 10^{-2}$ cc/s) | 18.9 | 13.5 | 13.8 | 13.7 |
| Yellowness Molding work stability | 1.5 | 1.4 | 1.2 | 1.3 |
| Silver streaking | A | A | A | A |
| Yellowness | 1.7 | 1.5 | 1.4 | 1.4 |

Examples 33–37 and Comparative Example 14

Polycarbonate resins and the siloxane compounds or stabilizers shown in Table 6 and were mixed at the ratios shown in the table by Henschel mixer or a tumbler, and extruded from a 65 mmφ single-screw vented extruder at a barrel temperature of 270° C. to produce pellets. These pellets were dried in a hot-air dryer at 120° C. for more than 5 hours and then injection molded at a resin temperature of 280° C. and a mold temperature of 80° C. to prepare the test pieces for determining the properties. Evaluation results are shown in Table 6.

TABLE 6

|  | Ex. 33 | Ex. 34 | Ex. 35 |
|---|---|---|---|
| Composition kind/amount (wt. parts) | | | |
| PC | S-2000 (100) | S-2000 (100) | S-2000 (100) |
| Siloxane compound | A (1.0) | A (4.0) | G (1.0) |
| weathering resistance improver | AU-1 (0.3) | AU-2 (0.3) | AU-1 (0.5) |
| Antioxidant (stabilizer) | — | AO-2 (0.1) | AO-2 (0.05) |
| Properties | | | |
| Haze (%) | 0.4 | 0.4 | 0.4 |
| Q-value ($\times 10^{-2}$ cc/s) | 13.5 | 62.0 | 16.4 |
| Weathering resistance (ΔYI) | 17.1 | 16.3 | 15.6 |

|  | Ex. 36 | Ex. 37 | Comp. Ex. 14 |
|---|---|---|---|
| Composition kind/amount (wt. parts) | | | |
| PC | S-2000 (100) | S-2000 (100) | S-2000 (100) |
| Siloxane compound | I (1.0) | A (1.0) | — |
| weathering resistance improver | AU-2 (0.8) | AU-1 (0.2) | — |
| Antioxidant (stabilizer) | AO-2 (0.02) | AO-4 (0.05) | — |
| Properties | | | |
| Haze (%) | 0.4 | 0.4 | 0.5 |
| Q-value ($\times 10^{-2}$ cc/s) | 9.9 | 13.5 | 5.0 |
| Weathering resistance (ΔYI) | 12.2 | 16.9 | 30.3 |

Examples 38–45 and Comparative Example 15

Polycarbonate resins, the siloxane compounds and release agents shown in Table 7 were mixed at the ratios shown in the table by Henschel mixer or a tumbler, and extruded from a 65 mmφ single-screw vented extruder at a barrel temperature of 270° C. to produce pellets. These pellets were dried in a hot-air dryer at 120° C. for more than 5 hours and then injection molded at a resin temperature of 280° C. and a mold temperature of 80° C. to prepare the test pieces for determining the properties. Evaluation results are shown in Table 7.

TABLE 7

|  | Ex. 38 | Ex. 39 | Ex. 40 | Ex. 41 | Ex. 42 |
|---|---|---|---|---|---|
| Composition kind/amount (wt. parts) | | | | | |
| PC | S-2000 (100) | S-2000 (100) | S-2000 (100) | S-2000 (100) | S-2000 (100) |
| Siloxane compound | A (1.0) | A (10.0) | B (1.0) | E (1.0) | F (1.0) |
| Release agent | RA-1 (0.1) | RA-2 (0.3) | RA-3 (0.5) | RA-4 (0.4) | RA-5 (0.3) |
| Properties | | | | | |
| Haze (%) | 0.4 | 0.5 | 0.4 | 0.4 | 0.4 |
| Q-value (× $10^{-2}$ cc/s) | 13.6 | 130.9 | 15.7 | 10.2 | 19.0 |
| Releasability | A | A | A | A | A |
| Release resistance (kg) | 518 | 422 | 385 | 374 | 340 |

|  | Ex. 43 | Ex. 44 | Ex. 45 | Comp. Ex. 15 |
|---|---|---|---|---|
| Composition kind/amount (wt. parts) | | | | |
| PC | S-2000 (100) | S-2000 (100) | S-2000 (100) | S-2000 (100) |
| Siloxane compound | A (1.0) | A (1.0) | A (1.0) | — |
| Release agent | RA-6 (0.05) | RA-7 (0.3) | RA-2/RA-6 (0.2/0.02) | — |
| Properties | | | | |
| Haze (%) | 0.4 | 0.4 | 0.4 | 0.5 |
| Q-value (× $10^{-2}$ cc/s) | 13.5 | 13.7 | 13.6 | 5.0 |
| Releasability | A | A | A | C |
| Release resistance (kg) | 593 | 319 | 401 | 768 |

Examples 46–51 and Comparative Examples 16–19

Polycarbonate resins, the styrene resins shown in Table 8 and, in the Examples and Comparative Example 17, either a siloxane compound or polycaprolactone (known fluidity improver) were mixed at the ratios shown in the table by Henschel mixer or a tumbler, and extruded from a 65 mmφ single-screw vented extruder at a barrel temperature of 260° C. to produce pellets. These pellets were dried in a hot-air dryer at 100° C. for more than 8 hours and then injection molded at a resin temperature of 260° C. and a mold temperature of 80° C. to prepare the test pieces for determining the properties. Evaluation results are shown in Table 8.

Examples 52–53 and Comparative Example 20

Polycarbonate resins, the styrene resins shown in Table 8 and, in the Examples, the siloxane compounds were mixed at the ratios shown in the table by Henschel mixer or a tumbler, and extruded from a 65 mmφ single-screw vented extruder at a barrel temperature of 270° C. to produce pellets. These pellets were dried in a hot-air dryer at 120° C. for more than 5 hours and then injection molded at a resin temperature of 280° C. and a mold temperature of 80° C. to prepare the test pieces for determining the properties. Evaluation results are shown in Table 8.

TABLE 8

| Composition Kind/amount (wt. parts) | Ex. 46 | Ex. 47 | Ex. 48 | Ex. 49 |
|---|---|---|---|---|
| PC | S-2000 (70) | S-2000 (70) | S-2000 (70) | S-2000 (70) |
| Styrene resin | HH-102 (30) | HH-102 (30) | HT478 (30) | HT478 (30) |
| Siloxane compound | A (1.0) | A (4.0) | A (1.0) | A (2.0) |
| Properties | | | | |
| Q-value (× $10^{-2}$ cc/s) | 47.2 | 112.3 | 32.8 | 52.6 |
| DTUL (° C.) | 119 | 106 | 118 | 115 |
| Bending modulus (MPa): | 2680 | 2710 | 2240 | 2270 |

| Composition Kind/amount (wt. parts) | Ex. 50 | Ex. 51 | Ex. 52 | Ex. 53 |
|---|---|---|---|---|
| PC | S-3000 (55) | S-3000 (55) | S-2000 (90) | S-2000 (90) |
| Styrene resin | UT-61 (45) | UT-61 (45) | D-232 (10) | D-232 (10) |
| Siloxane compound | A (1.0) | A (4.0) | G (1.0) | G (8.0) |
| Properties | | | | |
| Q-value (× $10^{-2}$ cc/s) | 28.3 | 89.4 | 30.9 | 181.8 |
| DTUL (° C.) | 109 | 103 | 131 | 114 |
| Bending modulus (MPa): | 2480 | 2530 | 2570 | 2700 |

| Composition kind/amount (wt. parts) | Comp. Ex. 16 | Comp. Ex. 17 | Comp. Ex. 18 | Comp. Ex. 19 | Comp. Ex. 20 |
|---|---|---|---|---|---|
| PC | S-2000 (70) | S-2000 (70) | S-2000 (90) | S-2000 (70) | S-2000 (55) |
| Styrene resin | HH-102 (30) | HH-102 (30) | D-232 (10) | HT478 (30) | UT-61 (45) |
| Siloxane compound | — | — | — | — | — |
| H1P | — | 5.0 | — | — | — |
| Properties | | | | | |
| Q-value (× $10^{-2}$ cc/s) | 24.4 | 33.1 | 14.2 | 21.5 | 18.0 |
| DTUL (° C.) | 122 | 97 | 134 | 122 | 112 |
| Bending modulus (MPa): | 2620 | 2730 | 2540 | 2170 | 2390 |

Examples 54–61

Polycarbonate resins, the polyester resins and siloxane compounds shown in Table 9, and 0.03 parts by weight of a phosphorus-based stabilizer (aforementioned AO-3) were mixed at the ratios shown in the table by Henschel mixer or a tumbler, and extruded from a 40 mmφ single-screw vented extruder at a barrel temperature of 260° C. to produce pellets. These pellets were dried in a hot-air dryer at 100° C. for more than 8 hours and then injection molded at a resin temperature of 260° C. and a mold temperature of 80° C. to prepare the test pieces for determining the properties. Evaluation results are shown in Table 9.

Comparative Examples 21–27

Pellets were produced in the same way as Example 54 at the formulations shown in Table 9 with further addition of 0.03 parts by weight of a phosphorus-based stabilizer (AO-3), and these pellets were injection molded and evaluated according to Example 54. Results are shown in Table 9.

TABLE 9

|  | Ex. 54 | Ex. 55 | Ex. 56 | Ex. 57 |
|---|---|---|---|---|
| Composition kind/amount (wt. parts) |  |  |  |  |
| PC | S-2000 (80) | S-2000 (60) | S-2000 (70) | S-2000 (60) |
| Polyester resin | TGS83A (20) | TGS83A (40) | 5008 (30) | 5008 (40) |
| Siloxane compound | A (1.0) | A (5.0) | G (1.0) | G (8.0) |
| Properties |  |  |  |  |
| Q-value (× 10⁻² cc/s) | 19.2 | 63.4 | 28.8 | 135.7 |
| DTUL (° C.) | 124 | 106 | 95 | 86 |
| Chemical resistance 1 | A | A | A | A |

|  | Ex. 58 | Ex. 59 | Ex. 60 | Ex. 61 |
|---|---|---|---|---|
| Composition kind/amount (wt. parts) |  |  |  |  |
| PC | S-2000 (85) | S-2000 (80) | S-2000 (70) | S-3000 (55) |
| Polyester resin | FS405Z (15) | FS405Z (20) | TGS83A/5008 (7.5/22.5) | TGS83A/5008 (12.5/32.5) |
| Siloxane compound | A (1.0) | A (2.0) | A (0.5) | A (3.0) |
| Properties |  |  |  |  |
| Q-value (× 10⁻² cc/s) | 14.2 | 17.1 | 23.8 | 64.3 |
| DTUL (° C.) | 123 | 119 | 105 | 83 |
| Chemical resistance 1 | A | A | A | A |

|  | Comp. Ex. 21 | Comp. Ex. 22 | Comp. Ex. 23 | Comp. Ex. 24 |
|---|---|---|---|---|
| Composition kind/amount (wt. parts) |  |  |  |  |
| PC | S-2000 (100) | S-2000 (80) | S-2000 (80) | S-2000 (60) |
| Polyester resin | — | TGS83A (20) | TGS83A (20) | TGS83A (40) |
| Siloxane compound | — | — | — | — |
| H1P | — | — | 5.0 | — |
| Properties |  |  |  |  |
| Q-value (× 10⁻² cc/s) | 5.0 | 8.8 | 12.9 | 13.2 |
| DTUL (° C.) | 135 | 126 | 101 | 113 |
| Chemical resistance 1 | D | A | C | A |

TABLE 9-continued

|  | Comp. Ex. 25 | Comp. Ex. 26 | Comp. Ex. 27 |
|---|---|---|---|
| Composition kind/amount (wt. parts) |  |  |  |
| PC | S-2000 (60) | S-2000 (80) | S-3000 (55) |
| Polyester resin | 5008 (40) | FS405Z (20) | TGS83A/5008 (12.5/32.5) |
| Siloxane compound | — | — | — |
| H1P | — | — | — |
| Properties |  |  |  |
| Q-value (× 10⁻² cc/s) | 22.0 | 6.1 | 20.5 |
| DTUL (° C.) | 92 | 128 | 94 |
| Chemical resistance 1 | A | A | A |

Examples 62–66

Polycarbonate resins, the copolymerized polyester resins and siloxane compounds shown in Table 10, and 0.03 parts by weight of a phosphorus-based stabilizer (aforementioned AO-3) were mixed at the ratios shown in the table by Henschel mixer or a tumbler, and extruded from a 40 mmφ single-screw vented extruder at a barrel temperature of 270° C. to produce pellets. These pellets were dried in a hot-air dryer at 120° C. for more than 5 hours and then injection molded at a resin temperature of 280° C. and a mold temperature of 80° C. to prepare the test pieces for determining the properties. Evaluation results are shown in Table 10.

Comparative Examples 28–30

Pellets were produced in the same way as Example 62 at the formulations shown in Table 10 with further addition of 0.03 parts by weight of a phosphorus-based stabilizer (AO-3), and these pellets were injection molded and evaluated in the same way as in Example 62. Results are shown in Table 10.

TABLE 10

|  | Ex. 62 | Ex. 63 | Ex. 64 | Ex. 65 | Ex. 66 |
|---|---|---|---|---|---|
| Composition kind/amount (wt. parts) |  |  |  |  |  |
| PC | S-2000 (99) | S-2000 (90) | S-2000 (70) | S-2000 (99) | S-2000 (99) |
| Co-polymerized polyester resins | NC102Z (1) | NC102Z (10) | NC102Z (30) | N10PET (1) | N31PET (1) |
| Siloxane compound | A (1.0) | A (6.0) | G (1.0) | A (1.0) | A (1.0) |
| Properties |  |  |  |  |  |
| Haze | 0.5 | 1.5 | 7.1 | 0.3 | 0.6 |
| Q-value (× 10⁻² cc/s) | 13.5 | 80.2 | 18.9 | 14.0 | 13.7 |

TABLE 10-continued

| DTUL (° C.) | 129 | 113 | 122 | 130 | 129 |
|---|---|---|---|---|---|
| Chemical resistance 2 | A | A | A | A | B |

| | Comp. Ex. 28 | Comp. Ex. 29 | Comp. Ex. 30 |
|---|---|---|---|
| Composition kind/amount (wt. parts) | | | |
| PC | S-2000 (100) | S-2000 (99) | S-2000 (99) |
| Copolymerized polyester resins | — | NC102Z (1) | NC102Z (1) |
| Siloxane compound | — | — | — |
| H1P | — | — | 5.0 |
| Properties | | | |
| Haze | 0.5 | 0.6 | 0.6 |
| Q-value (× 10$^{-2}$ cc/s) | 5.0 | 5.2 | 9.0 |
| DTUL (° C.) | 135 | 135 | 111 |
| Chemical resistance 2 | D | A | C |

What is claimed is:

1. A polycarbonate resin composition comprising (A) 100 parts by weight of a polycarbonate resin and (B) 0.001 to 20 parts by weight of a siloxane compound which is a polyorganosiloxane having such a structure that at least (1) an aromatic hydrocarbon group, (2) an aliphatic or aromatic organic group having at least one carboxylic acid ester linkage, ether linkage or mixture thereof, and (3) a phosphorus atom-containing group, are bonded to the silicon atoms therein.

2. A polycarbonate resin composition according to claim 1, wherein the organic group of (2) is represented by the formula(e):

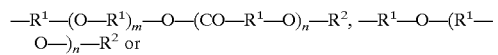

mixture thereof, wherein $R^1$s represent independently a $C_1$–$C_{30}$ aliphatic hydrocarbon group or an aromatic hydrocarbon group which may have a $C_6$–$C_{50}$ aliphatic hydrocarbon group as substituent; m is an integer of 0 to 100; n is an integer of 1 to 100; and $R^2$ represents a hydrogen atom, a $C_1$–$C_{30}$ aliphatic hydrocarbon group or a $C_6$–$C_{50}$ aromatic hydrocarbon group.

3. A polycarbonate resin composition according to claim 1, wherein the phosphorus atom-containing group of (3) is a group derived from at least one substance selected from phosphorous acid, phosphorous monoesters, phosphorous diesters, phosphoric acid, phosphoric monoesters and phosphoric diesters.

4. A polycarbonate resin composition according to claim 1, wherein the phosphorus atom-containing group of (3) is a group derived from a phosphoric ester.

5. A polycarbonate resin composition according to claim 1, wherein the phosphorus atom-containing group of (3) is at least one of the groups represented by the following formula (I):

wherein $R^3$s represent independently a hydrogen atom, a $C_1$–$C_{30}$ alkyl group, a $C_6$–$C_{50}$ aryl group, an arylalkyl group, a polyether group or a polyorganosiloxane group.

6. A polycarbonate resin composition according to claim 1, wherein the siloxane compound is of the structure represented by the formula M—(W)$_n$—M (wherein M represents monofunctional structural units; W represents bifunctional structural units; n is an integer of 3 to 1,000; W contains aliphatic structural unit A, aromatic structural unit B, structural unit C having carboxylic acid ester linkage and/or ether linkage, and phosphorus atom-containing structural unit D, wherein the ratios of the respective structural units in W are as follows: unit A=0 to 0.6; unit B=0.1 to 0.9; unit C=0.01 to 0.4; and unit D=0.01 to 0.4, with unit A+unit B+unit C+unit D=1).

7. A polycarbonate resin composition according to claim 1, wherein the siloxane compound is a compound represented by the following formula (II):

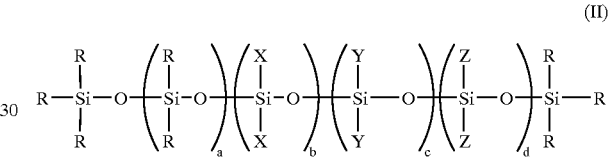

wherein "R"s represent independently an aliphatic hydrocarbon group; "X"s represent independently a hydrogen atom, an aliphatic hydrocarbon group, or an aromatic hydrocarbon group, but at least one of "X"s is an aromatic hydrocarbon group; "Y"s represent independently a hydrogen atom, an aliphatic hydrocarbon group, an aromatic hydrocarbon group, or an aliphatic or aromatic organic group having at least one carboxylic acid ester linkage and/or ether linkage, but at least one of "Y"s is said organic group; "Z"s represent independently a hydrogen atom, an aliphatic hydrocarbon group, an aromatic hydrocarbon group, or a phosphorus atom-containing group, but at least one of "Z"s is a phosphorus atom-containing group; a is a positive integer or 0, and b, c and d are each a positive integer, but 3≦a+b+c+d≦1000.

8. A polycarbonate resin composition according to claim 1, wherein the molecular weight of the siloxane compound is 800 to 40,000.

9. A polycarbonate resin composition according to claim 1, wherein the haze of a 3 mm thickness test piece comprising said polycarbonate resin composition measured according to JIS K6714 is not more than 10%.

10. A polycarbonate resin composition comprising (A) 95 to 5 parts by weight of a polycarbonate resin, (C) 5 to 95 parts by weight of a styrene resin, and (B) a siloxane compound in an amount of 0.001 to 20 parts by weight to 100 parts by weight of (A) and (C) combined, said siloxane compound of (B) being the polyorganosiloxane as defined in claim 1.

11. A polycarbonate resin composition comprising (A) 95 to 5 parts by weight of a polycarbonate resin, (D) 5 to 95 parts by weight of a polyester resin, and (B) a siloxane compound in an amount of 0.001 to 20 parts by weight to 100 parts by weight of (A) and (D) combined, said siloxane compound of (B) being the polyorganosiloxane as defined in claim 1.

12. A polycarbonate resin composition comprising (A) 99.9 to 50 parts by weight of a polycarbonate resin, (E) 0.1 to 50 parts by weight of a copolyester resin comprising at least two kinds of dicarboxylic acids and a diol, with 1 to 50 mol % of said dicarboxylic acids being constituted by naphthalenedicarboxylic acid, and (B) a siloxane compound in an amount of 0.001 to 20 parts by weight to 100 parts by weight of (A) and (E) combined, said siloxane compound of (B) being the polyorganosiloxane as defined in claim 1.

* * * * *